(12) United States Patent
Kim et al.

(10) Patent No.: US 10,895,863 B2
(45) Date of Patent: Jan. 19, 2021

(54) ELECTRONIC DEVICE AND METHOD FOR CONTROLLING THE SAME

(71) Applicant: Samsung Electronics Co., Ltd., Suwon-si (KR)

(72) Inventors: Hak-Lae Kim, Daejeon (KR); Jin-Seok Park, Suwon-si (KR); Tae-Jung Shim, Seoul (KR); Gun-Bong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

(21) Appl. No.: 15/399,322

(22) Filed: Jan. 5, 2017

(65) Prior Publication Data

US 2017/0192409 A1 Jul. 6, 2017

Related U.S. Application Data

(60) Provisional application No. 62/275,470, filed on Jan. 6, 2016.

(30) Foreign Application Priority Data

Apr. 5, 2016 (KR) .................. 10-2016-0041646

(51) Int. Cl.
*G05B 19/409* (2006.01)
*G05B 15/02* (2006.01)
*G05B 19/042* (2006.01)

(52) U.S. Cl.
CPC .......... *G05B 19/409* (2013.01); *G05B 15/02* (2013.01); *G05B 19/042* (2013.01); *G05B 2219/23289* (2013.01); *G05B 2219/2642* (2013.01)

(58) Field of Classification Search
CPC ................................................ G05B 19/042
See application file for complete search history.

(56) References Cited

U.S. PATENT DOCUMENTS

2005/0149927 A1 7/2005 Abe
2006/0064694 A1 3/2006 Messer et al.
(Continued)

FOREIGN PATENT DOCUMENTS

CN 1863095 A 11/2006
CN 102917271 A 2/2013
(Continued)

OTHER PUBLICATIONS

Extended European Search Report dated Dec. 3, 2018, issued in a counterpart European application No. 16884046.0-1205/3387821.
(Continued)

*Primary Examiner* — Tejal Gami
(74) *Attorney, Agent, or Firm* — Jefferson IP Law, LLP

(57) ABSTRACT

A method for operating an electronic device is provided. The method includes detecting a selection of a first task from among one or more tasks that are configured in a semantic information-based task ontology, identifying functions for each piece of device information corresponding to the first task, identifying functions corresponding to one or more devices by using a semantic information-based product information ontology, comparing the functions corresponding to the one or more devices with the functions for each piece of device information corresponding to the first task based on semantic information, and selecting a device to perform the first task from among the one or more devices based on the comparison result.

19 Claims, 41 Drawing Sheets

(56) References Cited

U.S. PATENT DOCUMENTS

| | | |
|---|---|---|
| 2006/0236325 A1 | 10/2006 | Rao et al. |
| 2007/0203860 A1 | 8/2007 | Golden et al. |
| 2007/0233287 A1 | 10/2007 | Sheshagiri et al. |
| 2007/0294692 A1 | 12/2007 | Zhao et al. |
| 2009/0144735 A1 | 6/2009 | Kim et al. |
| 2012/0268597 A1* | 10/2012 | Mizuno .............. G06Q 50/22 348/143 |
| 2013/0033649 A1 | 2/2013 | Kim et al. |
| 2013/0081021 A1* | 3/2013 | Levien .............. G06F 9/5027 718/100 |
| 2013/0082526 A1 | 4/2013 | Lee et al. |
| 2013/0139089 A1 | 5/2013 | Cho et al. |
| 2014/0244710 A1 | 8/2014 | Sharma et al. |
| 2015/0140990 A1 | 5/2015 | Kim et al. |
| 2015/0195365 A1 | 7/2015 | Choi et al. |
| 2015/0227618 A1 | 8/2015 | Dong et al. |
| 2015/0230282 A1 | 8/2015 | Kwon et al. |
| 2015/0256402 A1 | 9/2015 | Choi et al. |
| 2016/0358443 A1* | 12/2016 | True .................. G08B 25/08 |

FOREIGN PATENT DOCUMENTS

| | | |
|---|---|---|
| JP | 2004-348613 A | 12/2004 |
| KR | 10-2007-0010230 A | 1/2007 |
| KR | 10-2010-0054892 A | 5/2010 |
| KR | 10-2013-0035728 A | 4/2013 |
| KR | 10-2013-0060109 A | 6/2013 |
| KR | 10-2015-0059081 A | 5/2015 |
| KR | 10-2015-0082743 A | 7/2015 |

OTHER PUBLICATIONS

Extended European Search Report dated Apr. 17, 2020, issued in European Patent Application No. 19217745.9.

Chinese Office Action dated May 28, 2020, issued in Chinese Patent Application No. 201680078113.0.

* cited by examiner

ELECTRONIC DEVICE AND METHOD FOR CONTROLLING THE SAME

CROSS-REFERENCE TO RELATED APPLICATION(S)

This application claims the benefit under 35 U.S.C. § 119(e) of a U.S. Provisional application filed on Jan. 6, 2016 in the U.S. Patent and Trademark Office and assigned Ser. No. 62/275,470, and under 35 U.S.C. § 119(a) of a Korean patent application filed on Apr. 5, 2016 in the Korean Intellectual Property Office and assigned Serial No. 10-2016-0041646, the entire disclosure of each of which is hereby incorporated by reference.

TECHNICAL FIELD

The present disclosure relates to an electronic device and a method for controlling the same. More particularly, the present disclosure relates to an electronic device that is able to control other devices and a method for controlling the same.

BACKGROUND

Recently, internet of things (IoT)-related technologies have been widely developed. The IoT relates to internet connections between things, wherein all things may be given internet protocol (IP) addresses. For example, IP addresses may be given to a proximity sensor and an illumination system, respectively, in the house, and the proximity sensor and the illumination system may communicate with each other by using the IP addresses. Accordingly, if a user moves from a first point to a second point in the house, the proximity sensor that is installed in the second point may sense the user who has moved to the second point. The proximity sensor may transmit user movement information to the illumination system so that the illumination system may turn on a light in the second point and turn off a light in the first point. As described above, since communication between a plurality of electronic devices is available, a variety of services may be provided.

The above information is presented as background information only to assist with an understanding of the present disclosure. No determination has been made, and no assertion is made, as to whether any of the above might be applicable as prior art with regard to the present disclosure.

SUMMARY

However, the internet of things (IoT)-related technologies of the related art mainly relate to scenarios after a connection on the assumption that one electronic device has already been connected to the other electronic device. For example, the IoT-related technologies of the related art describe a method in which communication is performed when one electronic device approaches another electronic device and the other electronic device performs a specific task. However, the IoT-related technologies of the related art do not disclose a configuration of determining whether or not the other electronic device is suitable for performing a task or a configuration for selecting a device that is suitable for performing a task without the user's intervention.

Aspects of the present disclosure are to address at least the above-mentioned problems and/or disadvantages and to provide at least the advantages described below. Accordingly, an aspect of the present disclosure is to provide an electronic device that is able to select a device to perform a task by comparing a task to be performed with information of peripheral devices based on semantic information, and may further provide a method for controlling the same.

In accordance with an aspect of the present disclosure, a method for operating an electronic device is provided. The method includes detecting a selection of a first task from among one or more tasks that are configured in a semantic information-based task ontology, identifying functions for each piece of device information corresponding to the first task, identifying functions corresponding to one or more devices by using a semantic information-based product information ontology, comparing the functions corresponding to the one or more devices with the functions for each piece of device information corresponding to the first task based on semantic information, and selecting a device to perform the first task from among the one or more devices based on the comparison result.

In accordance with another aspect of the present disclosure, an electronic device is provided. The electronic device includes a communication circuit configured to receive a semantic information-based task ontology and a processor, wherein the processor is configured to detect a selection of a first task from among one or more tasks that are configured in the task ontology, identify functions for each piece of device information corresponding to the first task, identify functions corresponding to one or more devices by using a semantic information-based product information ontology that is obtained through the communication circuit, compare the functions corresponding to the one or more devices with the functions for each piece of device information corresponding to the first task based on semantic information, and select a device to perform the first task from among the one or more devices based on the comparison result.

In accordance with another aspect of the present disclosure, an electronic device is provided. The electronic device is able to select a device to perform a task by comparing a task to be performed with information about peripheral devices based on semantic information, and a method for controlling the same may be further provided. Accordingly, even in an environment in which a plurality of devices are disposed, the device that is able to perform a specific task may be automatically detected.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
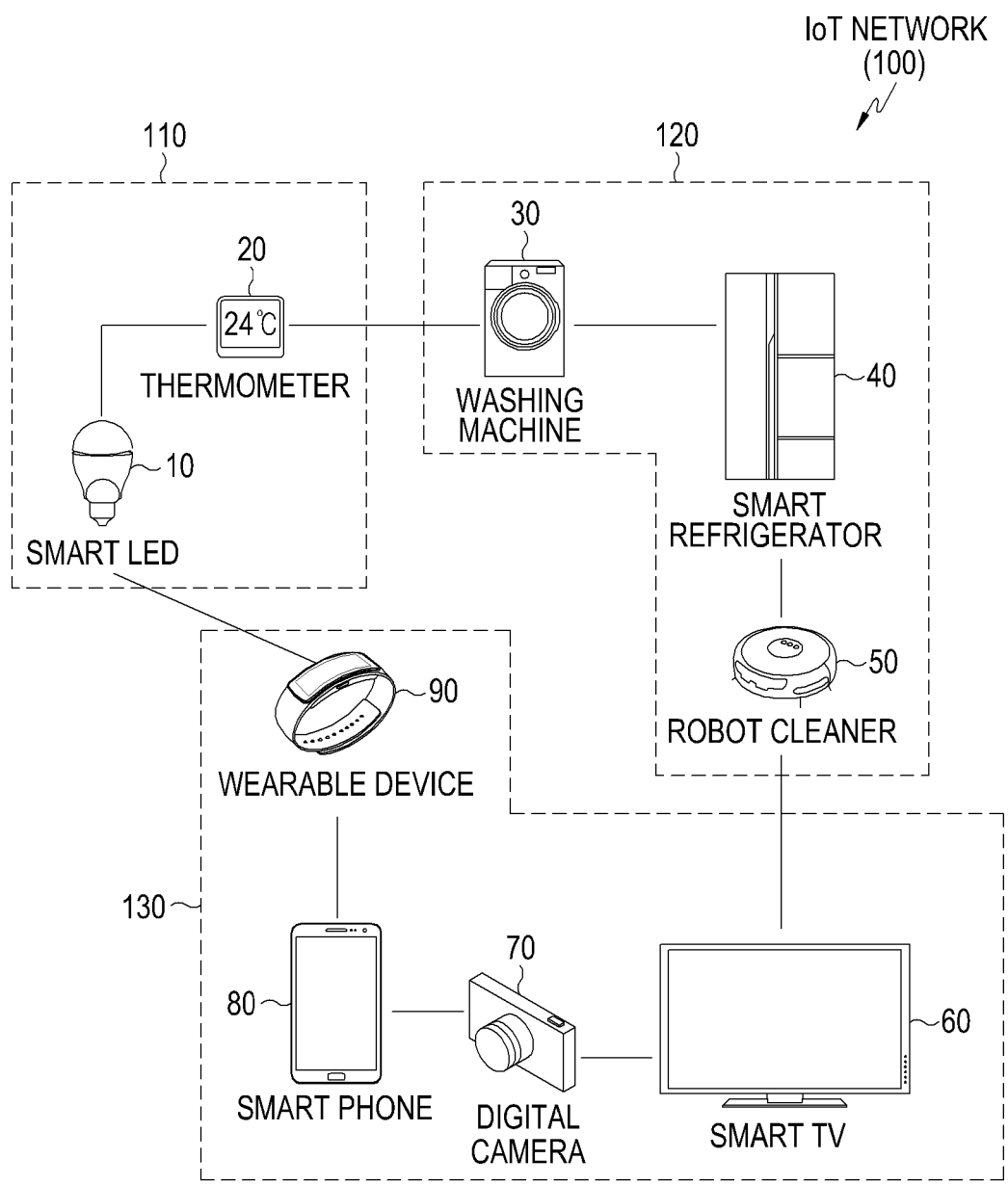
FIG. 1 illustrates a view showing an example of an internet of things (IoT) network configuration according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to various embodiments of the present disclosure, for example, may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer 3 (MP3) player, a mobile medical appliance, a camera, and a wearable device (e.g., smart glasses, a head-mounted-device (HMD), electronic clothes, an electronic bracelet, an electronic necklace, an electronic appcessory, an electronic tattoo, a smart mirror, or a smart watch).

According to some embodiments, the electronic device may be a smart home appliance. The home appliance may include at least one of, for example, a television, a digital versatile disc (DVD) player, an audio, a refrigerator, an air conditioner, a vacuum cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices such as a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

FIG. 1 is a view showing an example of an internet of things (IoT) network configuration according to various embodiments of the present disclosure.

Today, the range of communication between things is expanding from the machine to machine (M2M) concept in which intelligent communication can be conducted between people and things and between things by using mobile communication networks to the internet, and is rapidly evolving into a concept of interacting with all information of the real and virtual worlds as well as things. That is, the M2M that allows the safe and convenient intelligent communication to be performed between people and things and between things in real time at anytime and anywhere is expanding its range into the IoT while connecting all things around through the internet.

The IoT refers to a technology in which various things adopt sensors and a communication function in order to thereby connect to the internet. Here, the things may include a variety of embedded systems (a computer system of electronic equipment, such as a smart phone), such as home appliances, mobile devices, wearable computers, or the like. The things that are connected to the IoT devices may include identifiers (IDs) to distinguish between themselves. In addition, the IoT device, for example, may be connected to the internet with a specific internet protocol (IP) address, and may adopt a sensor therein in order to obtain information from the external environment.

An example of a network that is applied with such an IoT is shown in FIG. 1. FIG. 1 is a view showing an IoT network. Referring to FIG. 1, the IoT network 100 may include a smart light emitting diode (LED) 10, a thermometer 20, a washing machine 30, a smart refrigerator 40, a robot cleaner 50, a smart TV 60, a digital camera 70, a smart phone 80, a wearable device 90, or the like.

The devices constituting such an IoT network 100 may be divided into: small things 110, such as the smart LED 10 or the thermometer 20, of which the unique function is relatively simple and of which the hardware for providing IoT services is also implemented to be small according thereto; big things 120 having no display, such as the washing machine 30, the smart refrigerator 40, or the robot cleaner 50; and big things 130 having a display, such as the smart TV 60, the digital camera 70, the smart phone 80, or the wearable device 90.

Each device may transmit and receive data (for example, data in the form of a packet) that contains sensor data that is measured through the equipped sensors or information that is collected by the device, and thus, the information may be collected by a specific device (for example, the smart phone 80) to then be provided to a user. Alternatively, the information may be provided to an external service server so that services may be provided by using the information. For example, the room temperature may be measured by the thermometer 20 to then be transmitted to the smart phone 80, and the user may identify the same in order to thereby adjust the room temperature.

In addition, according to various embodiments of the present disclosure, the information that is transmitted from each IoT device (for example, information on the IoT device) may be transmitted to a server. The server may analyze the transmitted information and may determine the current state or predicted state of each IoT device. The information related to the current state and/or the predicted state that is determined by the server may be transmitted to the smart phone 80 or the like so that the user may identify the current state and/or the predicted state of each IoT device. For example, the user may identify the current state and/or the predicted state in order to thereby take action prior to the occurrence of a malfunction of the IoT device.

Each device constituting the IoT network 100, for example, may operate as a single node, and such a device as the smart TV 60, the digital camera 70, the smart phone 80, or the wearable device 90 may be selected as a sink node that collects information of other node devices.

Although the IoT network including a plurality of devices are described in FIG. 1, various embodiments of the present disclosure are not limited to the devices or the IoT network, and the present disclosure may include any electronic devices that can communicate with each other.

Figure 2A:
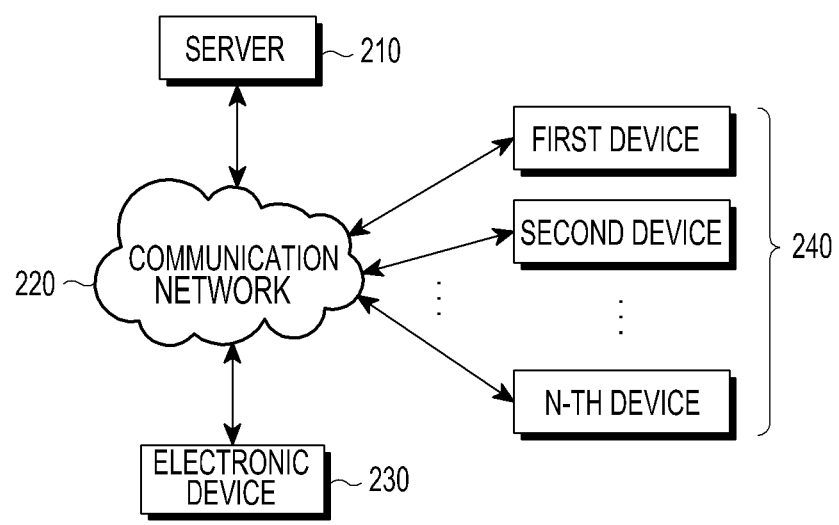
FIG. 2A illustrates a view showing an example of a network configuration according to various embodiments of the present disclosure.

FIG. 2A is a view showing an example of a network configuration according to various embodiments of the present disclosure.

Referring to FIG. 2A, the network, according to various embodiments of the present disclosure, may include a server 210, a communication network 220, an electronic device 230, or one or more devices 240. The devices 240 are specified to help in understanding embodiments the present disclosure, and are not limited to a specific type of electronic device. For example, the devices 240 may include any devices that adopt a wired or wireless communication function. In addition, the server 210 may be referred to as a knowledge-based intelligent personal assistant (IPA) server, but the server, according to the embodiments of the present disclosure, is not limited to a specific server name. In the present document, "device" may refer to an electronic device that is able to directly perform a specific task, and may be intended to be distinguished from an "electronic device" that creates and manages a specific task and transfers a task execution instruction.

The communication network 220 may provide communication between the server 210 and the electronic device 230 or the devices 240. For example, the communication network 220 may include at least one of Wi-Fi, Bluetooth (BT), near field communication (NFC), global positioning system (GPS), or cellular communication (for example, long term evolution (LTE), LTE-advanced (LTE-A), code division multiple access (CDMA), wideband CDMA (WCDMA), universal mobile telecommunications system (UMTS), wireless broadband (WiBro) or global system for mobile communications (GSM)). The wired communication, for example, may include at least one of universal serial bus (USB), high definition multimedia interface (HDMI), recommended standard 232 (RS-232), or plain old telephone service (POTS).

In addition, according to various embodiments of the present disclosure, the electronic device 230 may receive a variety of information from the devices 240. According to various embodiments of the disclosure, the device 240 may be one of a wireless tag, an IoT device, or a beacon transmitter that may provide information through short-range wireless communication.

Figure 2B:
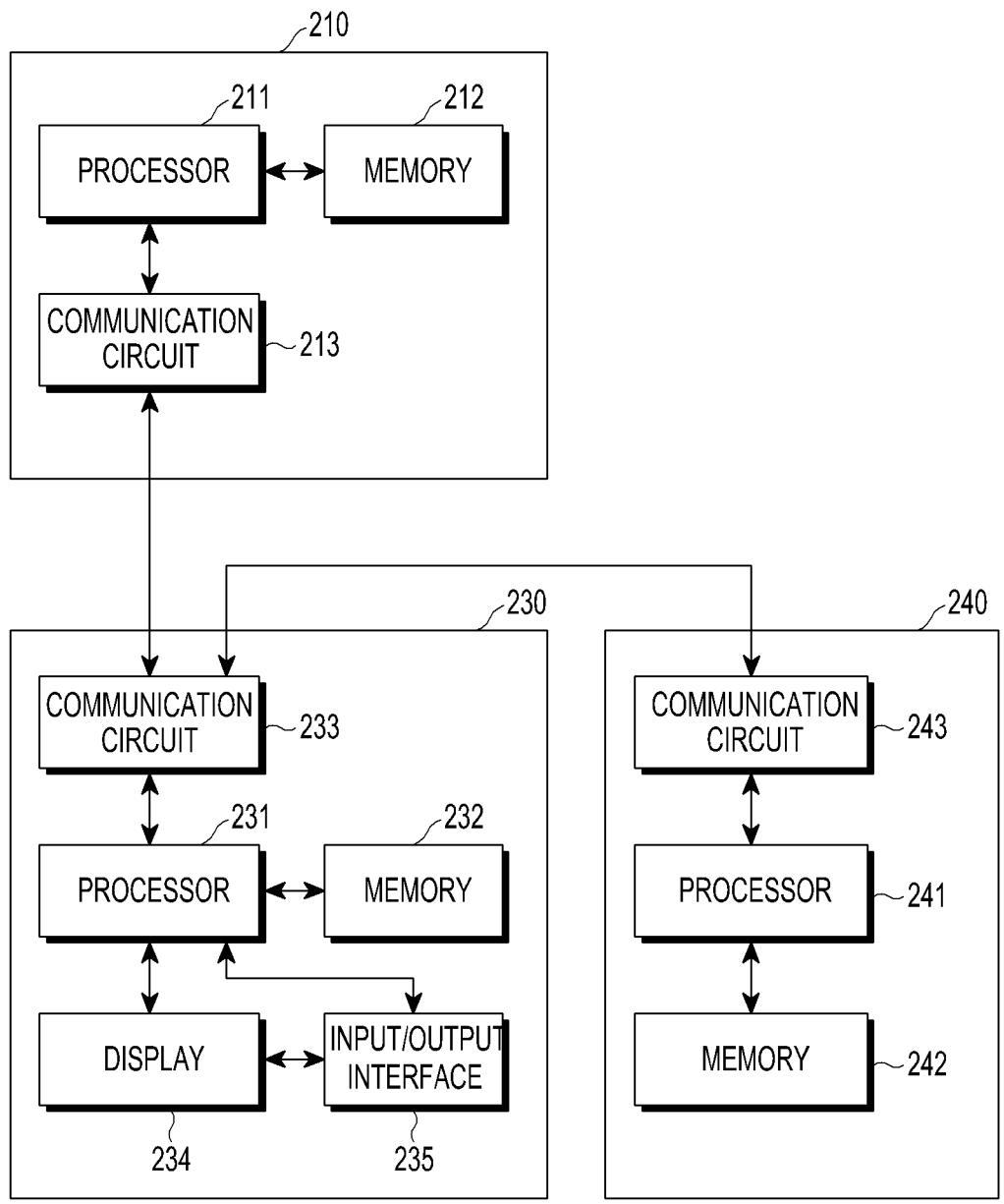
FIG. 2B illustrates a block diagram of a network configuration according to various embodiments of the present disclosure.

FIG. 2B illustrates a block diagram of entities according to various embodiments of the present disclosure.

Referring to FIG. 2B, the server 210 may include a processor 211, a memory 212, and a communication circuit 213. In addition, the electronic device 230 may include a processor 231, a memory 232, a communication circuit 233, a display 234, and an input/output interface 235. The device 240 may include a processor 241, a memory 242, and a communication circuit 243.

The processor 211, 231, or 241, for example, may control a multitude of hardware or software elements that are connected with the processor 211, 231, or 241, and may perform the processing of various pieces of data and a calculation by executing an operating system or application programs. The processor 211, 231, or 241, for example, may be implemented by a system on chip (SoC). According to an embodiment, the processor 211, 231, or 241 may further include a graphic processing unit (GPU) and/or an image signal processor. The processor 211, 231, or 241 may load instructions or data that is received from one or more other elements (for example, a non-volatile memory) to a volatile memory to then process the same, and may store resultant data in a non-volatile memory.

The memory 212, 232, or 242 for example, may include an internal memory or an external memory. The internal memory, for example, may include at least one of volatile memories (for example, a dynamic random access memory (DRAM), a static RAM (SRAM), a synchronous DRAM (SDRAM), or the like) or non-volatile memories (for example, a one time programmable read only memory (OTPROM), a PROM, an erasable PROM (EPROM), an electrically erasable PROM (EEPROM), a mask ROM, a flash ROM, a flash memory, a hard drive, a solid state drive (SSD), or the like). The external memory may include a flash drive, and, for example, may include compact flash (CF), secure digital (SD), micro-SD, mini-SD, extreme digital (xD), a multi-media card (MMC), a memory stick, or the like. The external memory may be functionally or physically connected to the server 210, the electronic device 230, or the device 240 through various interfaces.

The communication circuit 213, 233, or 243, for example, may include a cellular module, a Wi-Fi module, a BT module, a global navigation satellite system (GNSS) module, an NFC module, a radio frequency (RF) module, or the like. The cellular module, for example, may provide services of voice calls, video calls, text messaging, or the internet through communication networks. According to an embodiment, the cellular module may perform identification and verification of the server 210, the electronic device 230, or the devices 240 in communication networks by using a subscriber identification module (SIM) (for example, a SIM card). According to an embodiment, the cellular module may perform at least some of the functions that are provided by the processor. According to an embodiment, the cellular module may include a communication processor (CP). According to a certain embodiment, at least some (e.g., two or more) of the cellular module, the Wi-Fi module, the BT module, the GNSS module, or the NFC module may be included in a single integrated chip (IC) or IC package. The RF module, for example, may transmit and receive communication signals (e.g., RF signals). The RF module may include, for example, a transceiver, a power amplifier module (PAM), a frequency filter, a low noise amplifier (LNA), antennas, or the like. According to another embodiment, at least one of the cellular module, the Wi-Fi module, the BT module, the GNSS module, or the NFC module may transmit and receive RF signals through a separate RF module. The subscriber identification module, for example, may include a card that includes a SIM or an embedded SIM, and may contain inherent identification information (e.g., an integrated circuit card identifier (ICCID)) or subscriber information (e.g., an international mobile subscriber identity (IMSI)).

Throughout the present document, the execution of a specific operation by the server 210, the electronic device 230, or the device 240 may be understood to mean that the processor 211, 231, or 241 that is included in the server 210, the electronic device 230, or the device 240 performs a specific operation. Furthermore, the transmission of a specific signal to other entities or the reception of a specific signal from other entities by the server 210, the electronic device 230, or the device 240 may be understood to mean that the communication circuit 213, 233, or 243 that is included in the server 210, the electronic device 230, or the device 240 transmits and receives a specific signal. Furthermore, an operation in which the server 210, the electronic device 230, or the device 240 stores specific information may be understood to mean that the memory 212, 232, or 242 that is included in the server 210, the electronic device 230, or the device 240 stores specific information. Furthermore, an operation in which the electronic device 230 displays a specific screen may be understood to mean that the display 234 that is included in the electronic device 230 displays a specific screen. In addition, an operation in which the electronic device 230 obtains specific information may be understood to mean that the input/output interface 235 that is included in the electronic device 230 obtains specific information.

Meanwhile, like the electronic device 230, the device 240 may further include the display 234 and the input/output interface 235.

Figure 3:
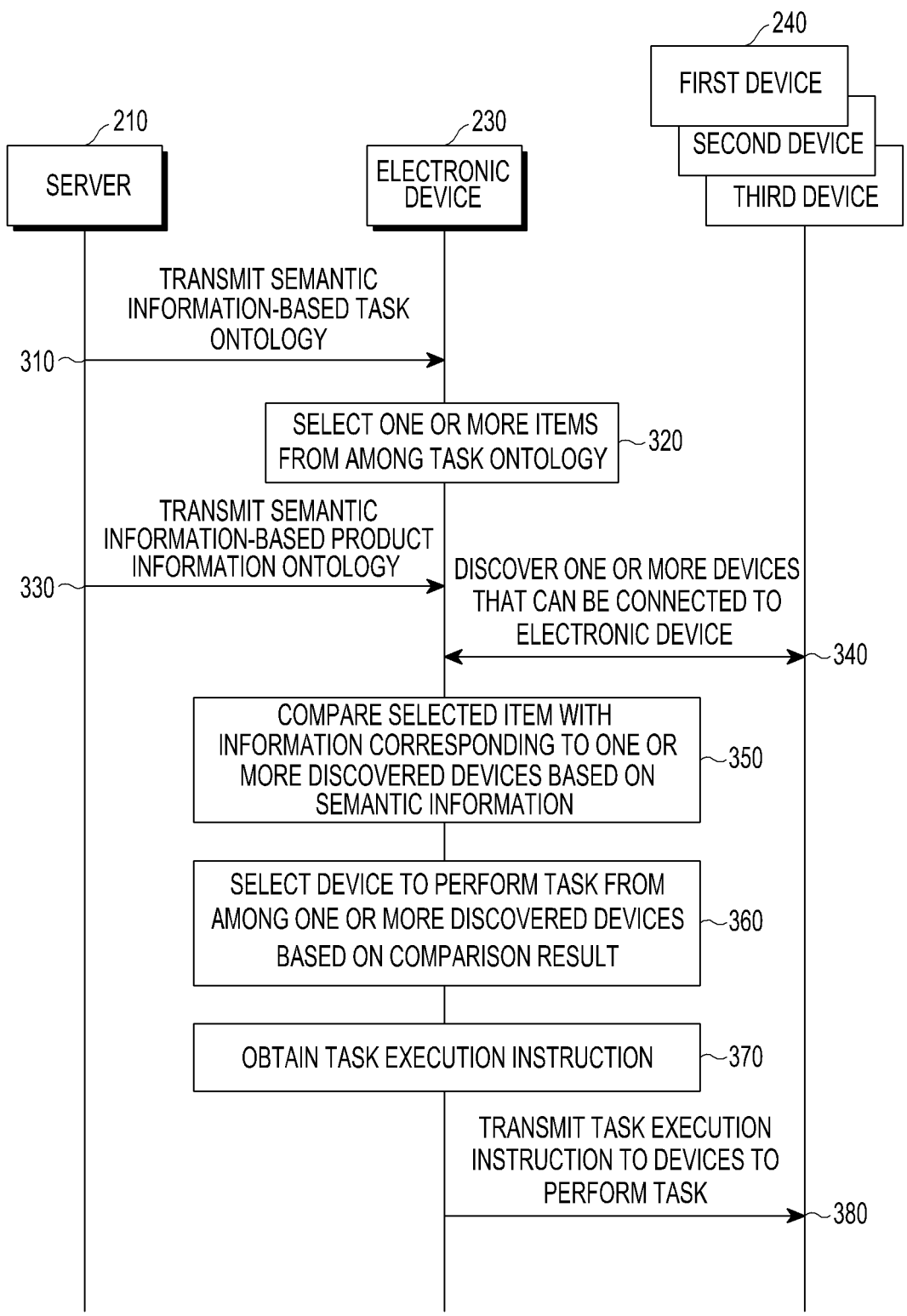
FIG. 3 illustrates a flowchart for performing an operation of an electronic device according to various embodiments of the present disclosure.

FIG. 3 illustrates a flowchart for performing an operation of an electronic device according to various embodiments of the present disclosure.

Figure 4:
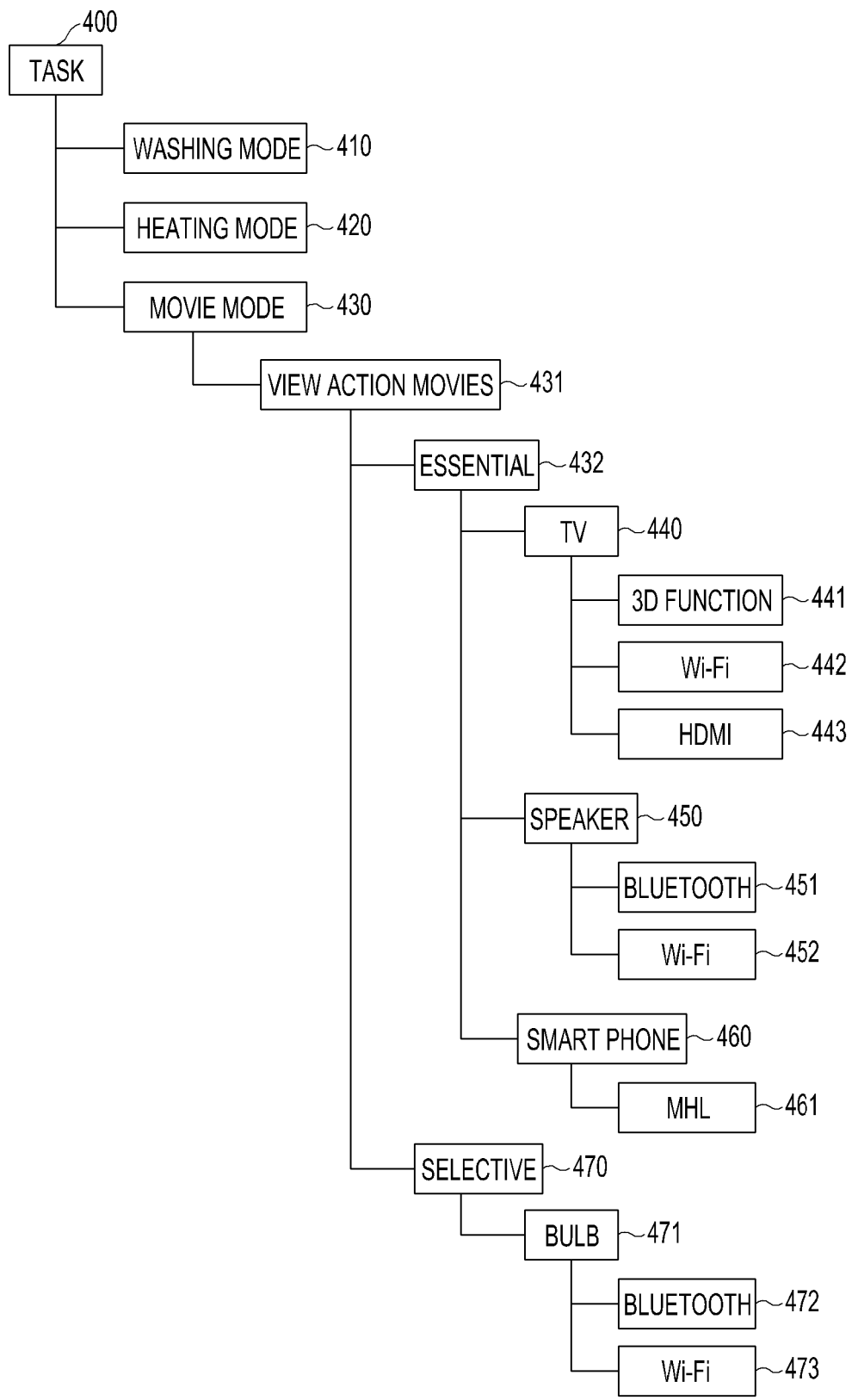
FIG. 4 illustrates a conceptual diagram of a semantic information-based task ontology according to various embodiments of the present disclosure.
Figure 5:
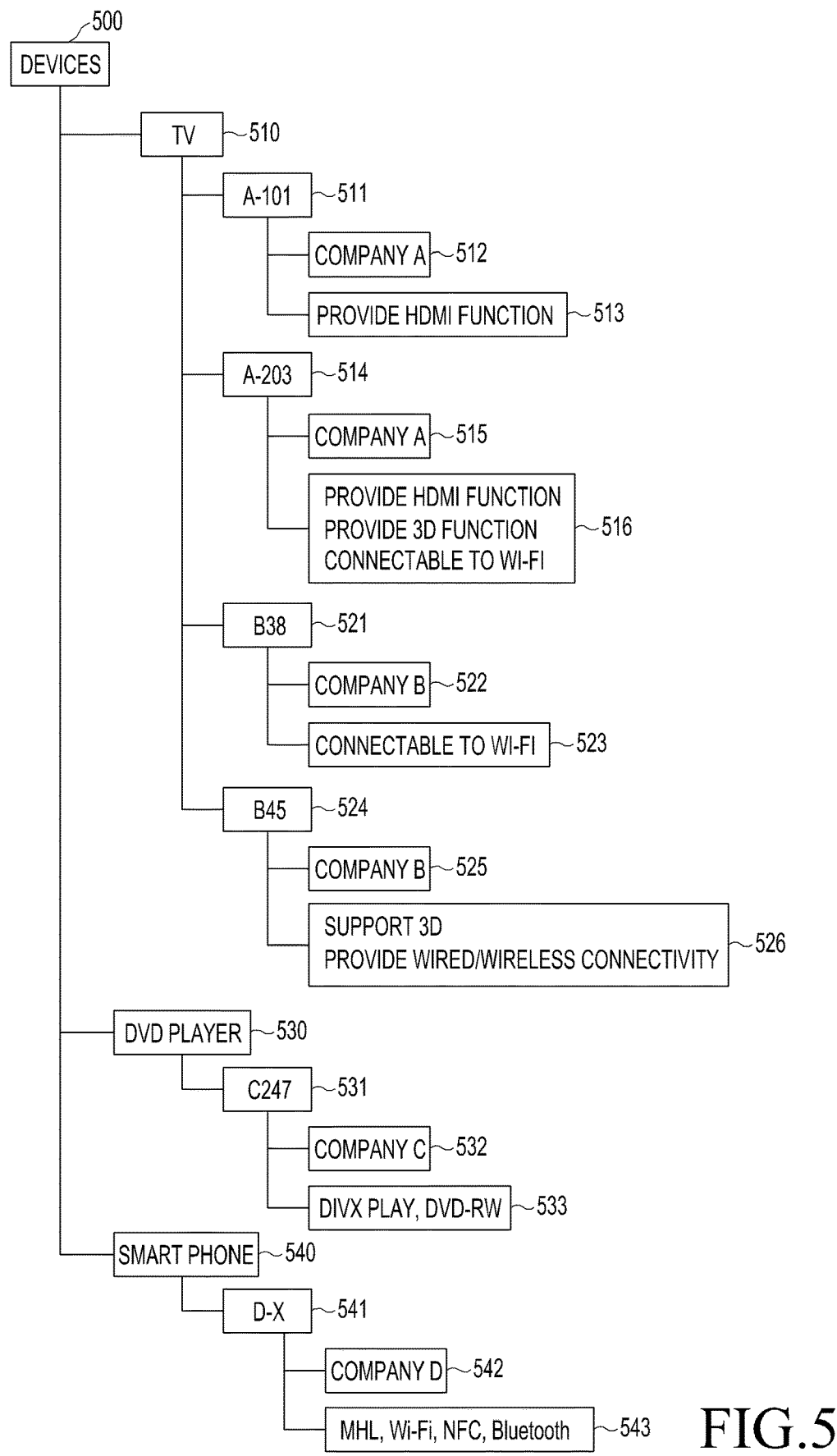
FIG. 5 illustrates a conceptual diagram of a semantic information-based product information ontology according to various embodiments of the present disclosure.

The embodiment of FIG. 3 will be described with reference to FIGS. 4 and 5. FIG. 4 is a conceptual diagram of a semantic information-based task ontology according to various embodiments of the present disclosure, and FIG. 5 illustrates a conceptual diagram of a semantic information-based product information ontology according to various embodiments of the present disclosure.

Referring to FIG. 3, the server 210 may transmit the semantic information-based task ontology to the electronic device 230 in operation 310 by using, for example, the communication circuit 213. Here, the semantic information base may mean a method in which information is processed based on the meaning of text. More specifically, the semantic information base may mean a processing method in which semantic information of the corresponding text is understood and semantic elements between a variety of information are connected in order to thereby extract and process the same according to intelligent determination. To this end, a method may be applied, which displays information of web pages by using a computer-recognizable language (semantic markup language). As the semantic markup language, language technologies, such as extensible markup language (XML) or resource description framework (RDF), have been standardized. Meanwhile, the ontology may mean a relationship between the semantic information-based elements, and, for example, may have a hierarchical structure, but the structure thereof is not limited. For example, the ontology may describe what the relationship is in the case where semantic elements of the first element and the second element are connected. For example, the ontology may describe a relationship in which the product model "A-101" belongs to a sub-concept of configuration elements of "TV", and this may be related to the fact that a specific TV product model is a sub-group of a concept of TV.

For example, the server 210 may transmit, to the electronic device 230, a semantic information-based task ontology 400 shown in FIG. 4. The task ontology 400 may include one or more items 410, 420, 430, and 431. Here, the item "Movie Mode" 430 may have a vertical relationship with the item "View Action Movies" 431. The item 431 may include an essential item 432 and a selective item 470. Each of the items 432 and 470 may include device information 440, 450, 460, or 471 that is required to perform a task and functions 441, 442, 443, 451, 452, 461, 472, and 473 corresponding to the device information 440, 450, 460, and 471, respectively. Here, the "device information" may refer to a group for separating the type of device, such as TV, an air conditioner, or the like. In addition, the "function" may mean a function of the device in order to perform a specific task. Meanwhile, the item 430 may also be referred to as a task as an element constituting the task ontology.

In operation 320, the electronic device 230 may select at least one item from among the task ontology. In various embodiments of the disclosure, the electronic device 230 may display one or more items 410, 420, 430, and 431, and may receive an input for selecting at least one of the displayed items. The electronic device 230 may display the items (for example, 410, 420, and 430) in the same level according to the structure of the task ontology 400, and may further display sub-items (for example, 431) upon the selection of one item (for example, 430). The electronic device 230 may receive an input for selecting at least one of the sub-items. Accordingly, the electronic device 230 may select one or more items of the task ontology 400. Alternatively, the electronic device 230 may select one or more items without a user input. For example, the electronic device 230 may sense a surrounding environment, and may select one or more items according to the sensed result.

Meanwhile, the task ontology 400 may be created and stored in the server 210 in advance based on at least one of an individual task relationship, device information that is required for performing a task, or functions that are required for performing a task. Alternatively, the task ontology 400 may be created or updated by the electronic device 230. More specifically, the task ontology 400 may be configured such that the item "Movie Mode" 430 includes the item "View Action Movies" 431. That is, the task ontology 400 may be configured based on a relationship between respective tasks (that is, the relationship means that "Movies" may contain "Action Movies"). Alternatively, the task ontology 400 may be configured so as to be related to the devices (for example, the TV 440, the speaker 450, or the smart phone 460) that are required to perform the item "View Action Movies" 431. That is, the task ontology 400 may be configured based on the devices that are required to perform a task. Here, the task ontology 400 may include device information 440, 450, or 460 that indicates the type of device without including the detailed device model names that are required to perform a task. According to this, various device models may be selected as a device to perform a task based on the task ontology 400, which will be described in more detail later. Alternatively, "View Action Movies" 431 of the task ontology 400 may be configured based on functions (such as, a three dimensional (3D) function 441, Wi-Fi 442, HDMI 443, Bluetooth 451, Wi-Fi 452, MHL 461, or the like) that are required to perform a task. Furthermore, the task ontology 400 may include control information for each device. For example, the task ontology 400 may further include control information (such as brightness information or color information) of the TV 440 that is configured in the item "View Action Movies" 431 of the task ontology 400. The control information may be configured by a user input, as a default value, or based on operation information of the current device.

In operation 330, the server 210 may transmit, to the electronic device 230, the semantic information-based product information ontology through, for example, the communication circuit 213. The electronic device 230 may receive the semantic information-based product information ontology through, for example, the communication circuit 233.

For example, the server 210 may transmit the product information ontology 500 as shown in FIG. 5. The product information ontology 500 may include device attributes 510, 530, and 540. The device attribute 510, 530, and 540, for example, may include at least one attribute, such as TV, a DVD player, or a smart phone. Model name information 511, 514, 521, 524, 531, and 541 may be defined in the sub-level of the device attributes 510, 530, and 540. Manufacturer information 512, 515, 522, 525, 532, and 542 may be defined in the sub-level of the model name information 511, 514, 521, 524, 531, and 541, respectively. Furthermore, functions 513, 516, 523, 526, 533, and 543 may be defined in the sub-level of the model name information 511, 514, 521, 524, 531, and 541, respectively. The manufacturer information 512, 515, 522, 525, 532, and 542 may not be defined depending on the implementation. Here, the function 513, 516, 523, 526, 533, or 543 corresponding to each model name information 511, 514, 521, 524, 531, or 541 may be stored based on semantic information. More specifically, a relationship between semantic elements of the model name information, the manufacturer information, the functions, and the device attributes may be stored as the ontology.

The product information ontology 500 may be created by the server 210 or the like based on the semantic information, such as the specification or the like, and may be updated by the electronic device 230 or the like.

In various embodiments of the present disclosure, the server 210 may transmit all, or some, of the product information ontology that is stored therein. For example, if the electronic device 230 selects the item "View Action Movies" 431 from among the task ontology 400, the electronic device 230 may transmit information about the selected item to the server 210. In this case, the server 210 may transmit all of the product information ontology 500. Alternatively, the server 210 may select a device attribute (for example, the TV 510 or the smart phone 540) corresponding to the item "View Action Movies" 431 from among the product information ontology 500, and may transmit the same to the electronic device 230. Alternatively, when a list of discovered devices is received from the electronic device 230, the server 210 may transmit, to the electronic device 230, the product information ontology corresponding to the discovered devices. Alternatively, when the server 210 obtains information on a device that is pre-registered in the electronic device 230, the server 210 may transmit, to the electronic device 230, the product information ontology about the device that is pre-registered in the electronic device 230. In another embodiment, the electronic device 230 may pre-store the product information ontology about a registered device at the time of registering a specific device.

In another embodiment, the server 210 may transmit, to the electronic device 230, information about the devices and functions in the form of a table instead of the hierarchical structure of the ontology as described above. For example, the server 210 may transmit information as shown in Table 1.

TABLE 1

| Devices | Functions |
| --- | --- |
| A-101 | Provide HDMI function |
| A-203 | Provide HDMI function |
|  | Provide 3D function |
|  | Connectable through Wi-Fi |

TABLE 1-continued

| Devices | Functions |
| --- | --- |
| B38 | Connectable through Wi-Fi |
| B45 | Support 3D |
|  | Provide wired/wireless connectivity |
| D-X | MHL, Wi-Fi, NFC, Bluetooth |

For example, the server 210 may store the devices and the functions so as to be related to each other in the form of a table instead of the hierarchical structure of the ontology, and may transmit, to the electronic device 230, all or some of the information in the form of a table as shown in Table 1. That is, in various embodiments of the present disclosure, the devices and functions may follow a variety of formats, such as an ontology form or a table form, and may be created based on semantic information.

In operation 340, the electronic device 230 may discover one or more devices 240 that can be connected to the electronic device 230. The electronic device 230 may discover one or more devices 240 based on a procedure that is defined in a variety of communication methods, and those skilled in the art may understand that the discovery method is not limited. Meanwhile, in various embodiments of the present disclosure, the electronic device 230 may identify the pre-registered devices 240, and more specifically, may identify identification information (for example, model names) and functions of the devices 240.

In operation 350, the electronic device 230 may determine, among the device information of the product information ontology 500, device information corresponding to the item that is selected from the task ontology 400, and may compare functions of the determined device information with functions of one or more devices that have been discovered based on semantic information. In operation 360, the electronic device 230 may select a device to perform a task from among one or more discovered devices based on the comparison result. For example, it is assumed that the electronic device 230 selects the item "View Action Movies" 431. The electronic device 230 may determine that the item "View Action Movies" 431 is related to the device attributes of the TV 440, the speaker 450, the smart phone 460, and the bulb 470 based on the task ontology 400. Furthermore, the electronic device 230 may determine that functions corresponding to the device attribute 440 of the TV 440 are a 3D function 441, a Wi-Fi function 442, and an HDMI function 443. The electronic device 230 may determine that the device that satisfies the 3D function 441, the Wi-Fi function 442, and the HDMI function 443 is A-203 (514) among the product information ontology 500. This may be caused by the fact that the electronic device 230 compares the functions 515 of A-203 (514) with the task ontology 400 based on semantic information. According to this, the electronic device 230 may automatically search for the candidates of a device that is to directly perform a task based on semantic information. In another embodiment, the electronic device 230 may determine that the device that satisfies the 3D function 441, the Wi-Fi function 442, and the HDMI function 443 is B45 (524) among the product information ontology 500. The functions 526 of B45 (524) are "support 3D and provide wired/wireless connectivity" in FIG. 5. The electronic device 230 may map "provide wired/wireless connectivity" with the Wi-Fi function 442 of wireless communication and the HDMI function 443 of wired communication, and this can be made by the comparison result based on semantic information. The electronic device 230 may select, as a device to perform a task, the device that has been discovered from among the devices corresponding to the selected item of the task ontology 400. For example, in the case where the electronic device 230 discovers the device A-203, the electronic device 230 may determine the device A-203 as a device to perform a task, and, in the case where the electronic device 230 discovers the device B-45, the electronic device 230 may determine the device B-45 as a device to perform a task.

According to the procedure described above, the electronic device 230 may select a device to perform a selected task from among the discovered electronic devices. According to this, the electronic device 230 may create a task. For example, the electronic device 230 may create a task in which the TV is selected as A-203 from among the devices to perform "View Action Movies," and may additionally select a device to perform a task corresponding to another device attribute in order to thereby share the created tasks with the server 210. The server 210 may add the shared tasks to the task ontology 400. For example, the server 210 may store the device A-203 so as to be related to correspond to the task of "View Action Movies" in the first place.

Meanwhile, the electronic device 230 may select other devices other than the TV. In addition, although the embodiment of FIG. 3 illustrates that the electronic device 230 selects a device to perform a task, this is only an example. In various embodiments of the present disclosure, the electronic device 230 may transmit, to the server 210, the information on the item that is selected from among the task ontology and a discovery result, and one or more devices to perform a task may be selected by using the task ontology and the product information ontology that are stored in the server 210 and by using the received discovery result. That is, the server 210 may select a device to perform a task, and may transmit the selection result to the electronic device 230.

In operation 370, the electronic device 230 may obtain task execution instructions. In operation 380, the electronic device 230 may transmit task execution instructions to the devices to perform a task. The electronic device 230 may transmit control information that is configured in the task ontology 400 to each device to perform a task. For example, the electronic device 230 may transmit, to the TV of A-203, color information and brightness information that are configured to correspond to the item "View Action Movies" 413. The TV of A-203 may operate according to the received control information in order to thereby display a screen in the color and brightness that are configured by the user or are configured to be optimized for viewing action movies.

Figure 6:
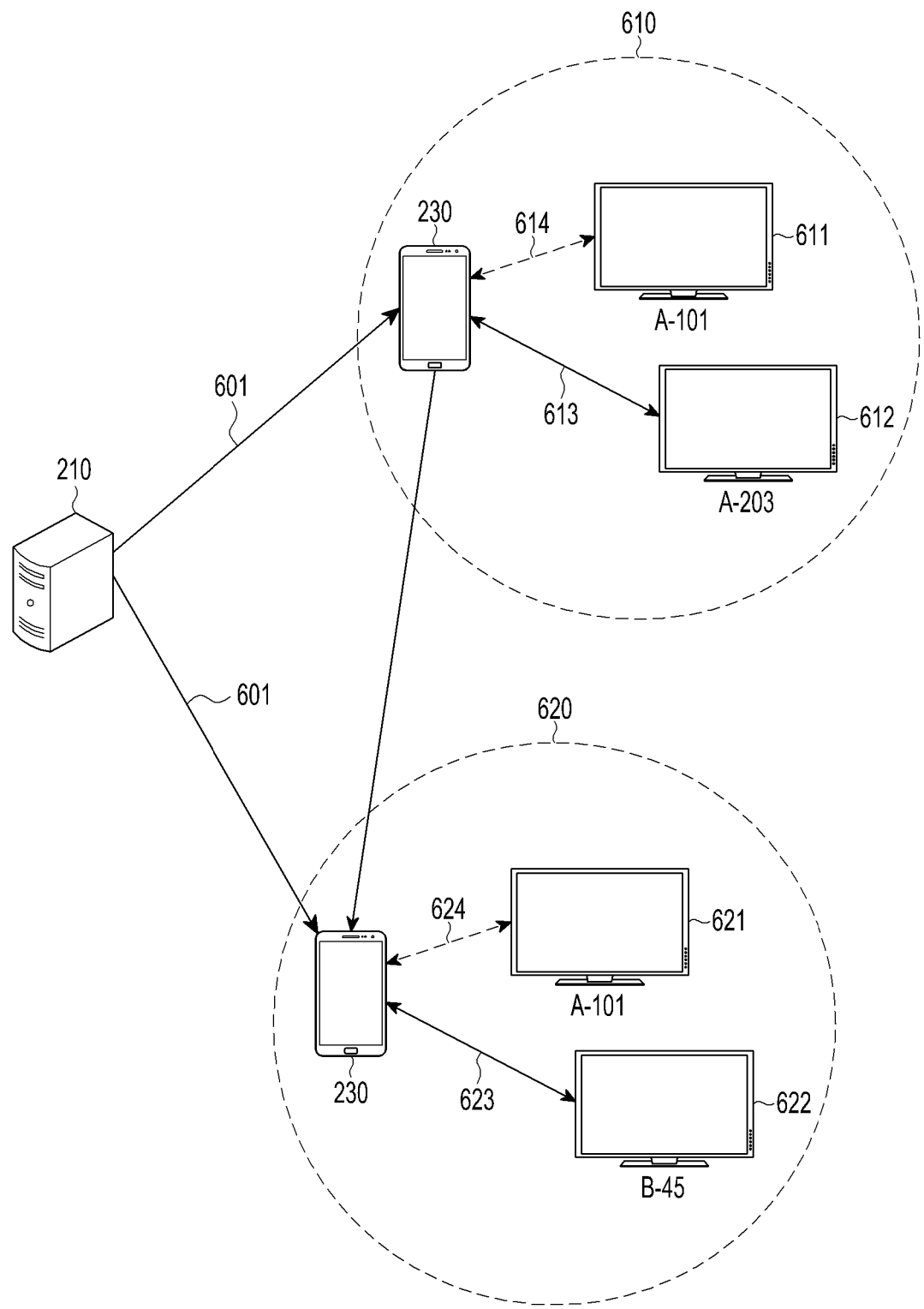
FIG. 6 illustrates a conceptual diagram for explaining a selection for a device to perform a task according to various embodiments of the present disclosure.

FIG. 6 illustrates a conceptual diagram for explaining a selection for a device to perform a task according to various embodiments of the present disclosure.

Referring to FIG. 6, the electronic device 230 may be disposed in a first network 610. Here, the first network 610 may represent the range in which communication is available, and it is not limited to a physical range. The electronic device 230 may communicate with a first TV 611 and a second TV 612 while being disposed in the first network 610. The electronic device 230 may perform communications 613 and 614 with the first TV 611 and the second TV 612 based on various communication methods, and may discover the first TV 611 and the second TV 612, respectively, according to the procedure that is defined in the corresponding communication method.

The electronic device 230 may receive, from the server 210, at least one 601 of the task ontology or the product information ontology. The electronic device 230 may select the device 612 to perform a task from among one or more discovered TVs 611 and 612 according to the description in relation to FIG. 3 above. For example, the electronic device 230 may select the TV 612 of A-203 as a device to perform the item "View Action Movies" according to the task ontology 400 and the product information ontology 500 of FIGS. 4 and 5. Accordingly, the electronic device 230 may select the TV 612 as a device to perform a task to then create a task, and may share the created task with a server 210. Meanwhile, when a task execution instruction is detected later, the electronic device 230 may transmit, to the TV 612, the task execution instruction for "View Action Movies". The electronic device 230 may transmit, to the TV 612, control information that is pre-configured in the task ontology.

The electronic device 230 may move or otherwise be out of the first network 610 and be disposed in a second network 620. When the electronic device 230 is disposed in the second network 620, it may communicate with a third TV 621 and a fourth TV 622. The electronic device 230 may perform communications 623 and 624 with the third TV 621 and the fourth TV 622 based on various communication methods, and may discover the third TV 621 and the fourth TV 622, respectively, according to a procedure that is defined in the corresponding communication method.

The electronic device 230 may receive, from the server 210, at least one 601 of the task ontology or the product information ontology. The electronic device 230 may select the device 622 to perform a task from among the one or more discovered TVs 621 and 622 according to the description in relation to FIG. 3 above. For example, the electronic device 230 may select the TV 622 of B-45 as a device to perform the item "View Action Movies" according to the task ontology 400 and the product information ontology 500 of FIGS. 4 and 5. Accordingly, the electronic device 230 may select the TV 622 as a device to perform a task to then create a task, and may share the created task with a server 210. Meanwhile, when a task execution instruction is detected later, the electronic device 230 may transmit, to the TV 622, the task execution instruction for "View Action Movies". The electronic device 230 may transmit, to the TV 622, control information that is pre-configured in the task ontology.

As described above, when the electronic device 230 is disposed in various environments (for example, the first network 610 or the second network 620), it may select a device that is able to perform a task by using the task ontology and the product information ontology. In particular, since the electronic device 230 is able to select a device to perform a task based on the semantic information-based comparison result, a configured task can be performed without a user's intervention. More specifically, the electronic device 230 may perform the comparison based on a relationship of the semantic elements between the configuration elements of the task ontology and the configuration elements of the product information ontology, and may select a device to perform a task based on the result thereof. Accordingly, if it is not required to pre-select a device to perform a task, the task can be easily performed according to the movement of the electronic device 230.

Figure 7:
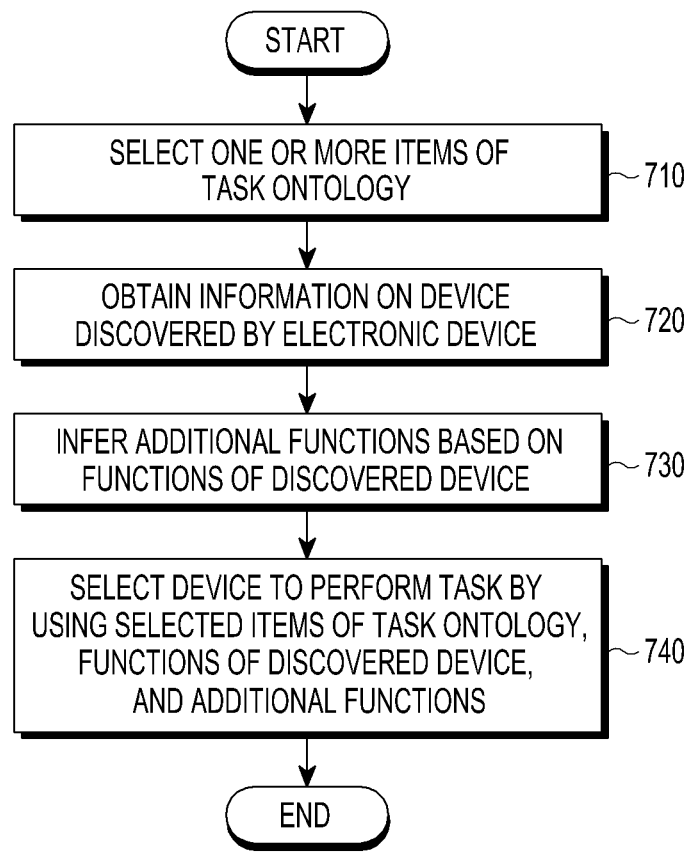
FIG. 7 illustrates a flowchart for explaining an operation of an electronic device according to various embodiments of the present disclosure.
Figure 8:
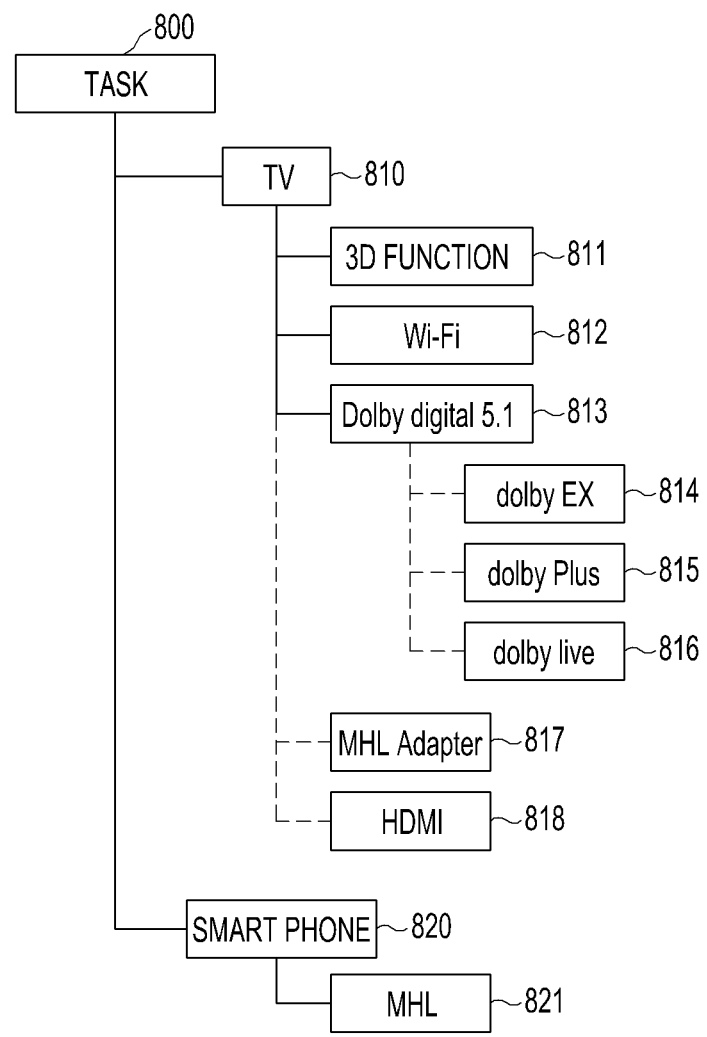
FIG. 8 illustrates a conceptual diagram of a task ontology according to various embodiments of the present disclosure.

FIG. 7 illustrates a flowchart for explaining an operation of an electronic device according to various embodiments of the present disclosure. The embodiment of FIG. 7 will be described in more detail with reference to FIG. 8. FIG. 8 illustrates a conceptual diagram of a task ontology according to various embodiments of the present disclosure.

Referring to FIG. 7, the electronic device may select one or more items of the task ontology in operation 710. In operation 720, the electronic device may obtain information on the device that has been discovered by the electronic device. In operation 730, additional functions may be inferred based on the functions corresponding to the item that is selected from the task ontology. For example, as shown in FIG. 8, the electronic device may obtain a task ontology 800 corresponding to the selected items. The task ontology 800 may be configured such that the TV 810 includes functions of 3D 811, Wi-Fi 812, and Dolby-digital 5.1 (813). In addition, the task ontology 800 may be configured such that the smart phone 820 includes an MHL function 821. The electronic device may infer additional functions of Dolby-EX 814, Dolby Plus 815, and Dolby live 816 based on the function of Dolby-digital 5.1 (813). The electronic device may infer additional functions that includes the text of "Dolby" based on the similarity of the semantic analysis result. More specifically, the electronic device may infer, as the additional functions, Dolby-EX 814, Dolby Plus 815, and Dolby live 816 that have been determined to be configuration elements that have similar meanings as that of the configuration elements of "Dolby-digital 5.1".

Furthermore, the electronic device may infer additional functions of MHL adapter 817 and HDMI 818 of the TV 810 from the function of MHL 821 of the smart phone 820. The electronic device may infer an additional function of HDMI 818 for a wired connection of the TV and an additional function of MHL adapter 817 for the compatibility of the HDMI 818 and the MHL 821 from the fact that the function of MHL 821 is intended to connect a smart phone and TV. Although the embodiment of FIG. 8 describes the process in which the electronic device infers the additional functions corresponding to the functions based on the task ontology 800, the electronic device, according to various embodiments of the present disclosure, may infer the additional functions corresponding to the functions based on the product information ontology.

In operation 740, the electronic device may select a device to perform a task by using the functions of the selected items of the task ontology, the additional functions thereof, and the functions of the discovered devices. In operation 750, the electronic device may create a task based on the selected devices.

Figure 9A:
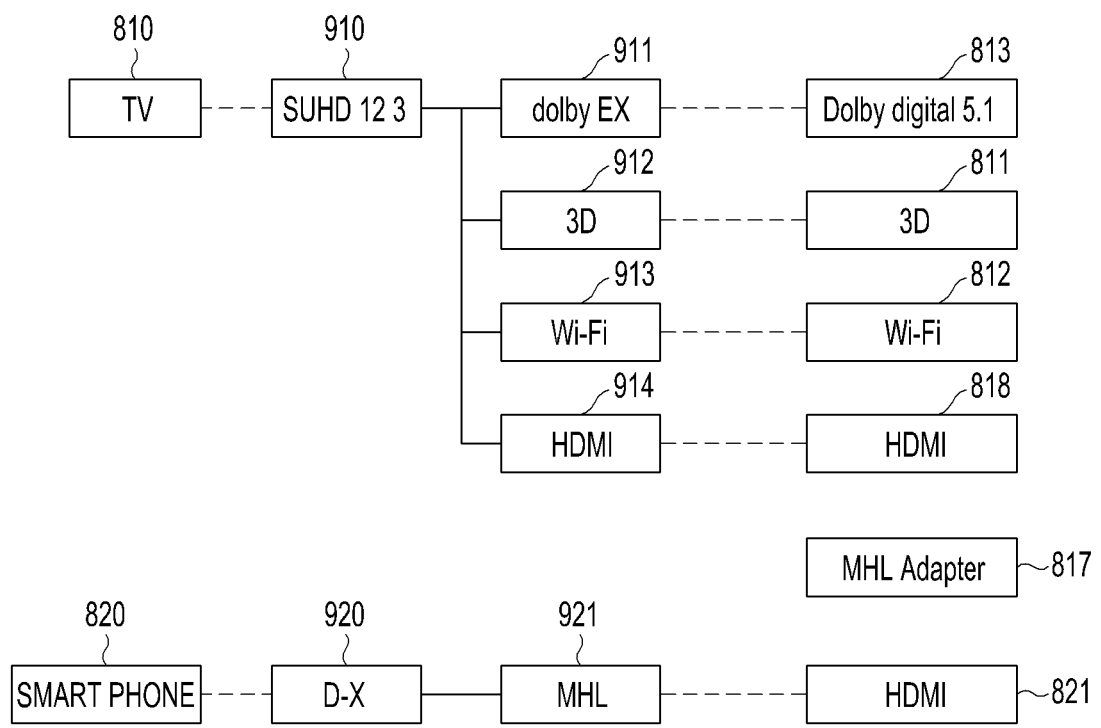
FIG. 9A illustrates a conceptual diagram for explaining a process of selecting a device to perform a task by using inferred additional functions according to various embodiments of the present disclosure.

FIG. 9A illustrates a conceptual diagram for explaining a process of selecting a device to perform a task by using inferred additional functions according to various embodiments of the present disclosure.

Referring to FIG. 9A, it is assumed that the electronic device, for example, infers additional functions 814, 815, 816, 817, and 818 by using a pre-obtained task ontology 800 as shown in FIG. 8. Meanwhile, the electronic device may determine functions of the discovered devices by using the product information ontology. For example, as shown in FIG. 9A, the electronic device may determine that the TV of SUHD 123 (910) includes a function of Dolby EX 911, a function of 3D 912, a function of Wi-Fi 913, and a function of HDMI 914 by using the product information ontology.

The electronic device may compare the functions of the discovered devices with at least one of the functions of the task ontology or the additional functions. For example, the electronic device may match the function of Dolby EX 911 of SUHD 123 (910) to the function of Dolby digital 5.1 (813) of the task ontology 800. This may be due to the fact that the electronic device infers the additional function of Dolby EX 814 from the function of Dolby digital 5.1 (813) of the task ontology 800. That is, the electronic device may match Dolby EX 814, which is the additional function inferred from the task ontology 800, to Dolby EX 911, which is the function of the discovered device. Meanwhile, the electronic device may match the functions of 3D 912 and Wi-Fi 913 of the discovered device to the functions of 3D 811 and Wi-Fi 812 of the task ontology 800, respectively.

The electronic device may determine whether or not the additional function of HDMI 818 that is inferred from the MHL function 821 of the task ontology 800 is included in the discovered device. The electronic device may determine that the discovered SUHD 123 (910) has the function of HDMI 914 by using the product information ontology, and may match the function of HDMI 914 to the inferred additional function of HDMI 818. Accordingly, the electronic device may determine SUHD 123 (910) as a device to perform a task. Furthermore, the electronic device may determine that D-X 920 has a function of MHL 921 by using the product information ontology, and may determine D-X 920 as a device to perform a task by matching the function of MHL 921 to the function of MHL 821 of the task ontology.

Figure 9B:
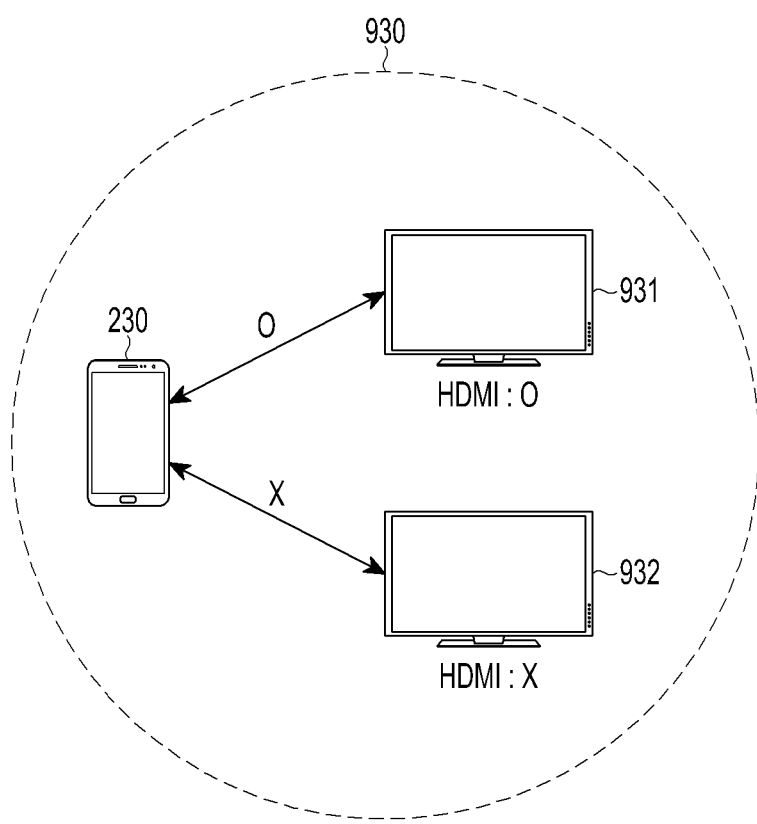
FIG. 9B illustrates a conceptual diagram for explaining a process of selecting a device to perform a task of an electronic device according to various embodiments of the present disclosure.

FIG. 9B illustrates a conceptual diagram for explaining a process of selecting a device to perform a task of the electronic device.

Referring to FIG. 9B, the electronic device 230 may be disposed in a network 930. The electronic device 230 may discover the first TV 931 and the second TV 932, and may determine functions of the first TV 931 and the second TV 932 by using the product information ontology. Accordingly, the electronic device 230 may determine that the first TV 931 provides a function of HDMI and the second TV 932 does not provide a function of HDMI.

Meanwhile, the electronic device 230 may receive a task ontology from a server (not shown). For example, the electronic device 230 may receive the task ontology 800 of FIG. 8, and the item of TV 810 of the task ontology 800 may not include the function of HDMI 818 in advance. Although the function of HDMI 818 is not included in the initial task ontology 800, the electronic device 230 may infer the function of HDMI 818 from the function of MHL 821, and may use the HDMI 818 that is an inferred additional function as a reference for selecting a device to perform a task. Accordingly, the electronic device 230 may select, as a device to perform a task, the first TV 931 that provides the HDMI function, and may exclude the second TV 932 that does not provide the HDMI function from the candidates for a device to perform a task. Meanwhile, the electronic device 230 may share the task ontology that includes the inferred additional function with a server (not shown), and the server (not shown) may update the task ontology by reflecting the inferred result. In addition, as described above, the electronic device 230 may infer additional functions with respect to the product information ontology to then share the same with the server (not shown), and the server (not shown) may update the product information ontology by using the shared additional functions.

If the electronic device 230 selects the second TV 932 that does not provide the HDMI function, the MHL function cannot be operated in the smart phone so that all of the tasks cannot be performed. That is, the electronic device 230 may more accurately determine a device to perform a task in consideration of additional functions corresponding to the first device information that is inferred from the functions of the first device information and additional functions corresponding to the first device information that is inferred from the functions of the second device information.

Figure 10:
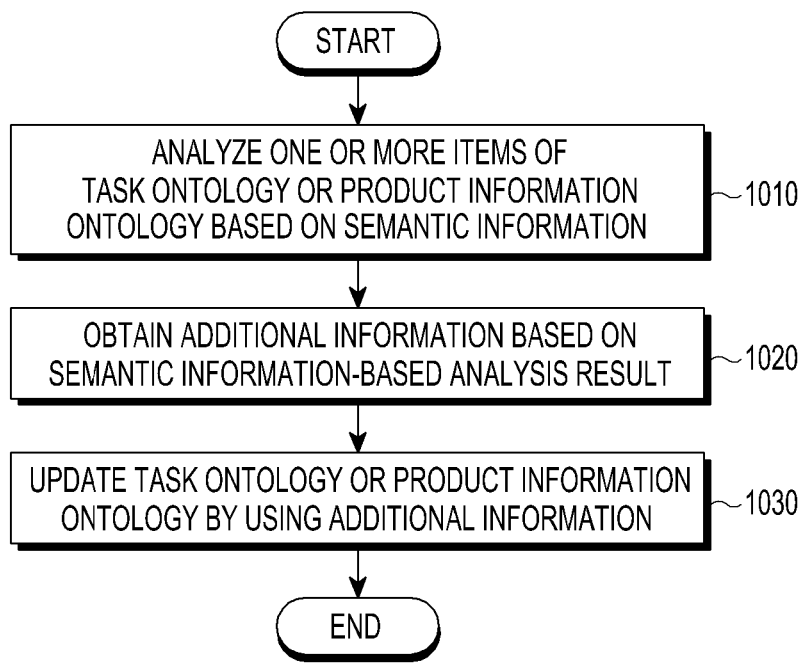
FIG. 10 illustrates a flowchart for explaining an update of an ontology by inference according to various embodiments of the present disclosure.

FIG. 10 illustrates a flowchart for explaining an update of an ontology by inference according to various embodiments of the present disclosure.

Referring to FIG. 10, the electronic device may analyze one or more items of a task ontology or a product information ontology based on semantic information in operation 1010. Alternatively, a server that stores the task ontology or the product information ontology may analyze one or more items of the task ontology or the product information ontology based on semantic information.

In operation 1020, the electronic device or server may obtain additional information based on the semantic information-based analysis result. In operation 1030, the electronic device or server may update the task ontology or the product information ontology by using the additional information.

FIGS. 11A, 11B, 11C, and 11D illustrate conceptual diagrams for explaining an update of an ontology according to various embodiments of the present disclosure. Although the electronic device is described to update the ontology in FIGS. 11A to 11D, the server may update the ontology as well.

Figure 11A:
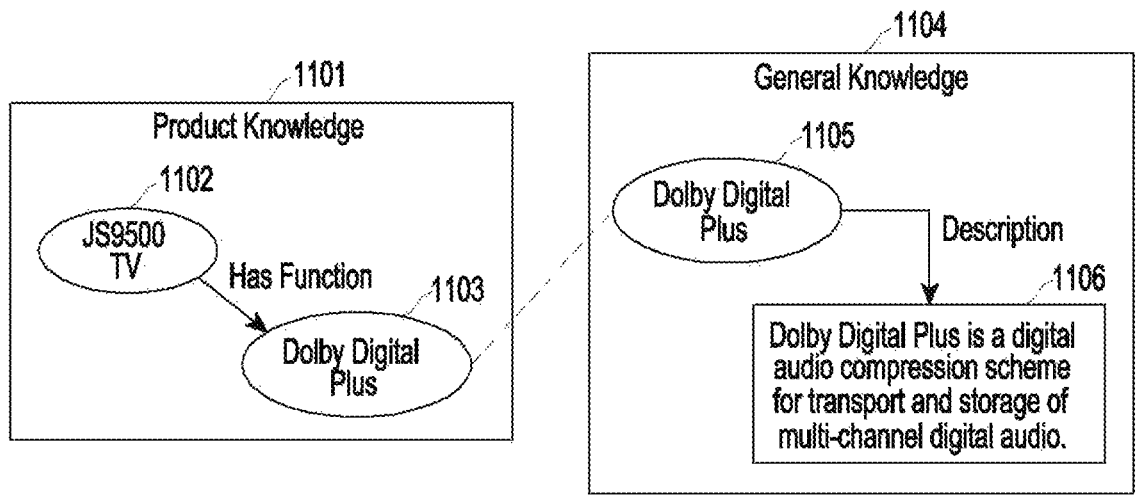
FIGS. 11A, 11B, 11C, and 11D illustrate conceptual diagrams for explaining the update of the ontology according to various embodiments of the present disclosure.

FIG. 11A illustrates a conceptual diagram for explaining an update of an ontology by using detailed information on the specification and functions of a device. For example, the electronic device may include a product knowledge 1101 in the ontology. The product knowledge 1101 may state that the TV 1102 of JS9500 has a function of Dolby Digital Plus 1103. The electronic device may obtain a general knowledge 1104 that contains a relationship between Dolby Digital Plus 1105 and the description 1106 corresponding thereto. For example, the electronic device may obtain the description 1106 through a semantic information-based web search with respect to the function of Dolby Digital Plus 1103. Furthermore, the electronic device may reflect the description 1106 into the ontology. According to this, even when a specific item of the task ontology is configured to be "Multi-channel Audio" as a function thereof, the electronic device may determine JS900 TV 1102 as a device to perform a task by using the updated ontology. For example, it is assumed that the function of the TV corresponding to the item "View Action Movies" of the task ontology is configured as "Multi-channel Audio". The electronic device cannot determine JS900 TV 1102 that has the function of Dolby Digital Plus 1103 as a device to perform a task by the product information ontology before the update. However, the electronic device may determine that the description 1106 "Dolby digital plus is a digital audio compression scheme for transport and storage of multi-channel digital audio" corresponds to the function of "Multi-channel Audio" of the task ontology by using the updated product information ontology. According to this, the electronic device may more accurately determine a device to perform a task by using the updated product information ontology.

Figure 11B:
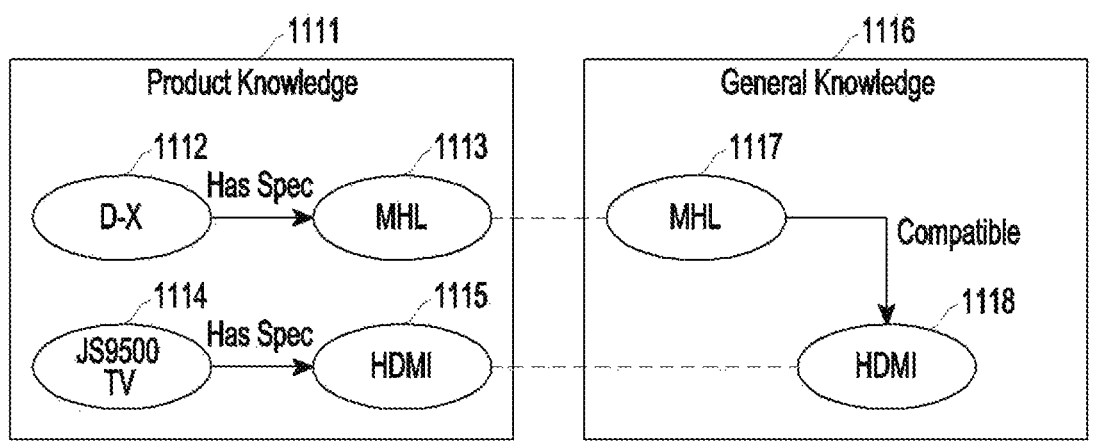

FIG. 11B illustrates a conceptual diagram for explaining an update of an ontology by using the compatibility of a device. For example, the electronic device may include a product knowledge 1111 in the ontology. The product knowledge 1111 may state that D-X 1112 has a function of MHL 1113 and JS9500 TV 1114 has a function of HDMI 1115. The electronic device may obtain a general knowledge 1116 stating that the function of MHL 1117 and the function of HDMI 1118 are compatible with each other. Accordingly, the electronic device may determine that D-X 1113 and JS9500 TV 1114 can be connected to each other, and may provide the best connection path by using the information.

Figure 11C:
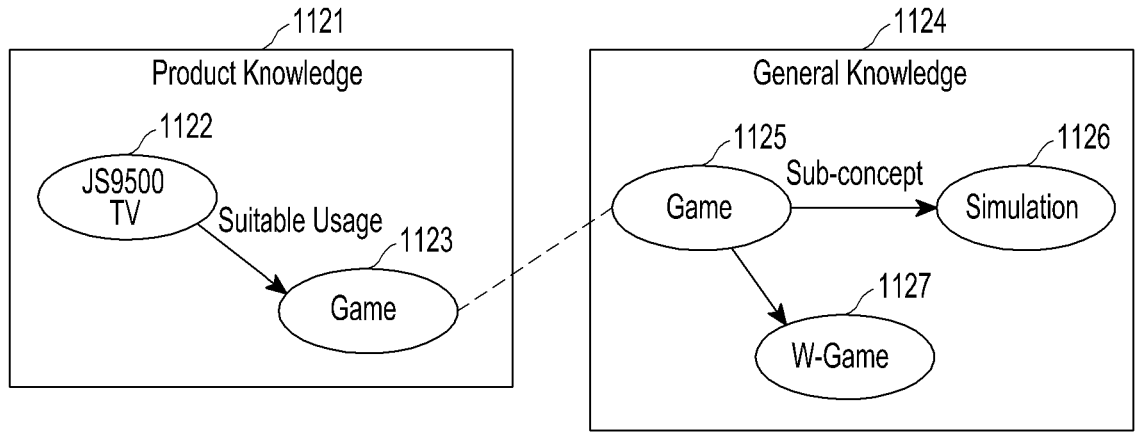

FIG. 11C illustrates a conceptual diagram for explaining an update of an ontology by using detailed information about common sense. For example, the electronic device may include a product knowledge 1121 in the ontology. The product knowledge 1121 may state that JS9500 TV 1122 has the usage of Game 1123. The electronic device may obtain a general knowledge 1124 in which Game 1125 includes Simulation 1126 and W-game 1127 as sub-concepts. The electronic device may update the product information ontology by relating W-game 1127 and Simulation 1126 to JS9500 TV 1122. According to this, when "W-game" is included in the task ontology, the electronic device may determine JS9500 TV 1122 as a device to perform a task.

Figure 11D:
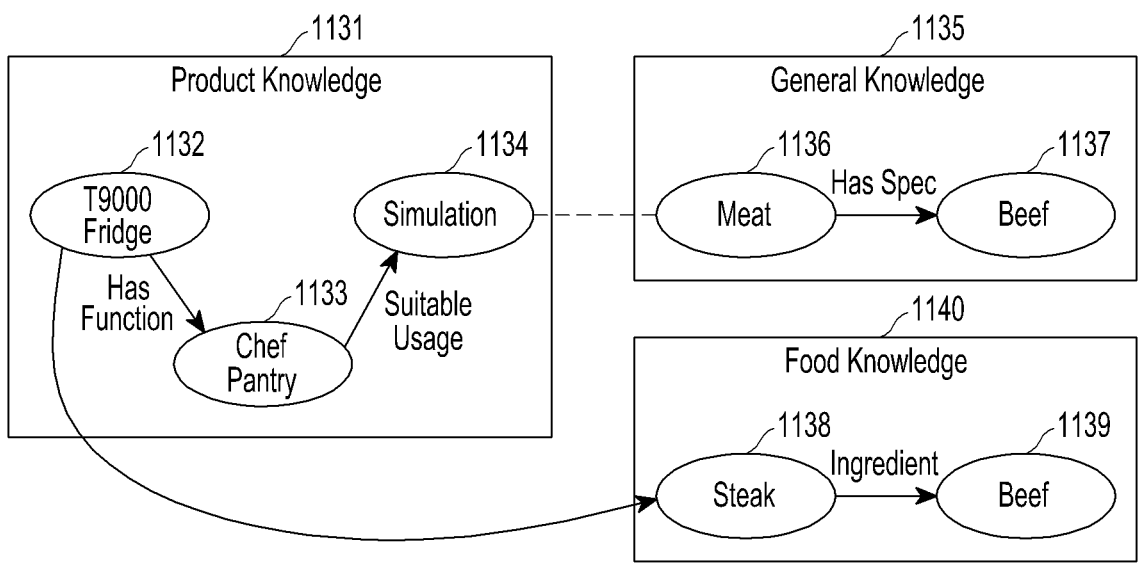

FIG. 11D illustrates a conceptual diagram for explaining an update of an ontology by using knowledge in another domain. For example, the electronic device may include a product knowledge 1131 in the ontology. The product knowledge 1131 may state that T900 Fridge 1132 has a function of Chef Pantry 1133 and the function of Chef Pantry 1133 has the usage of Meat 1134. The electronic device may obtain a general knowledge 1135 in which Meat 1136 includes Beef 1137 as a sub-concept and a food knowledge 1140 in which Steak 1138 includes Beef 1139 as an ingredient. The electronic device may update the product information ontology by relating Beef 1137 and Steak 1138 to T900 Fridge 1132. According to this, when the task ontology includes "Steak", the electronic device may determine T900 Fridge 1132 as a device to perform a task.

As described above, an electronic device, according to various embodiments of the present disclosure, can update an ontology by using a variety of knowledge based on semantic information, and can more accurately determine a device to perform a task.

Figure 12:
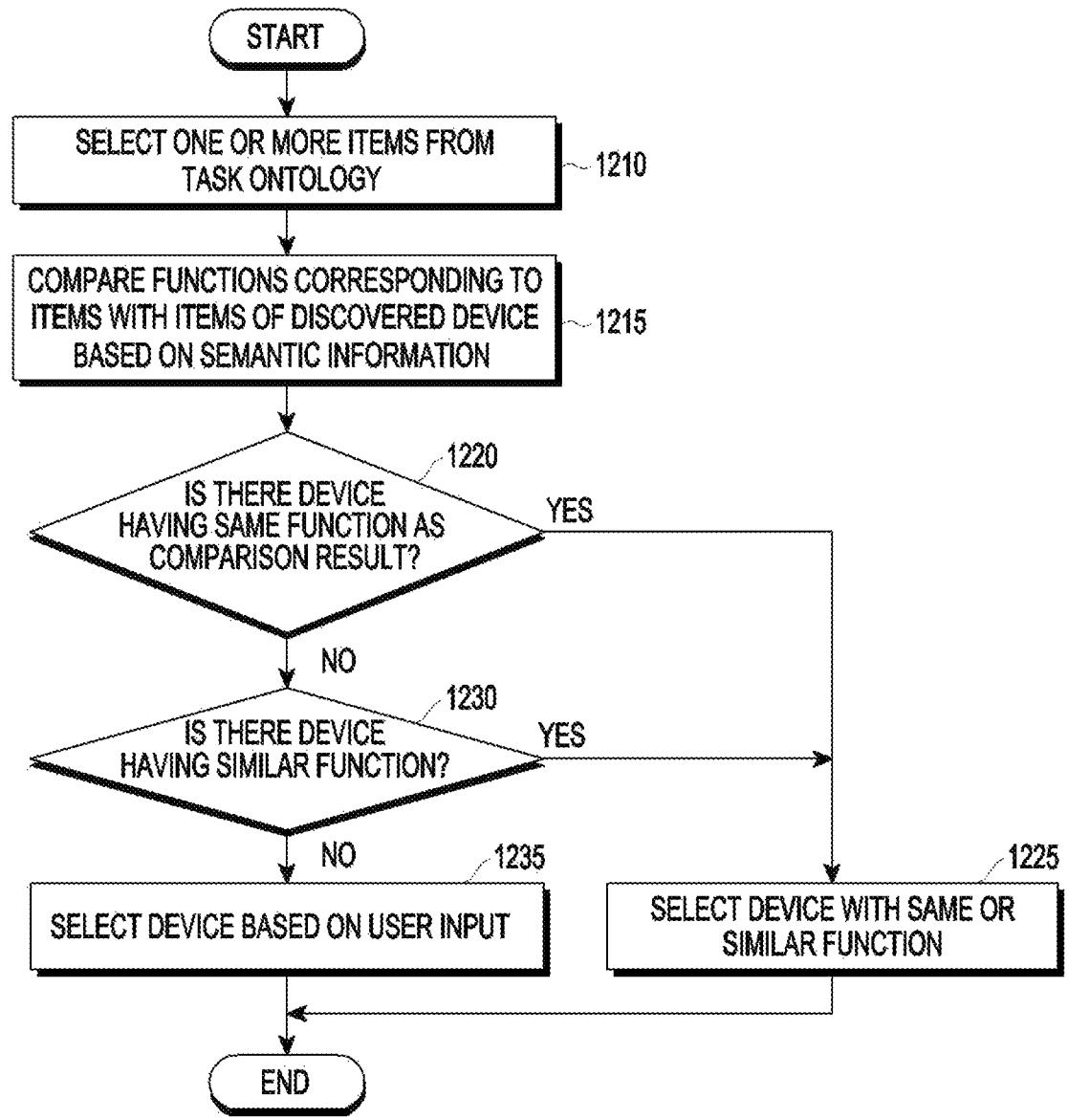
FIG. 12 illustrates a flowchart for explaining a process of selecting a device to perform a task according to various embodiments of the present disclosure.

FIG. 12 illustrates a flowchart for explaining a process of selecting a device to perform a task according to various embodiments of the present disclosure.

Referring to FIG. 12, the electronic device may select one or more items from among the task ontology in operation 1210. In operation 1215, the electronic device may compare functions corresponding to the items with the items of the discovered devices based on semantic information. In operation 1220, the electronic device may determine whether or not there is a device that has the same function as a result of the comparison. That is, the electronic device may determine whether or not there is a device that has the same text as the text corresponding to the selected items of the task ontology based on semantic information. If there is a device that has the same function, the electronic device may select the device that has the same function as a device to perform a task in operation 1225.

If there is no device that has the same function, the electronic device may determine whether or not there is a device that has a similar function in operation 1230. That is, the electronic device may determine whether or not there is a device that has similar text as the text corresponding to the selected items of the task ontology based on semantic information. If there is a device that has a similar function, the electronic device may select, as a device to perform a task, the device that has a similar function in operation 1225. If there is no device that has a similar function, the electronic device may select a device based on a user input in operation 1235.

Figure 13:
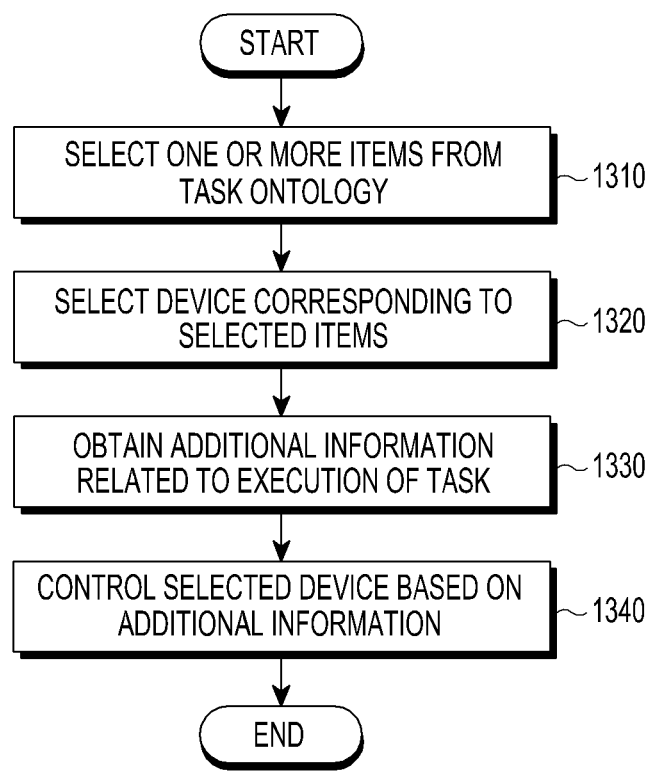
FIG. 13 illustrates a flowchart for explaining an operating method of an electronic device according to various embodiments of the present disclosure.

FIG. 13 illustrates a flowchart for explaining an operating method of an electronic device according to various embodiments of the present disclosure.

Referring to FIG. 13, the electronic device may select one or more items from among the task ontology in operation 1310. In operation 1320, the electronic device may select devices corresponding to the selected items. In operation 1330, the electronic device may obtain additional information that is related to the execution of a task. In operation 1340, the electronic device may control the selected devices based on the additional information. For example, the electronic device may obtain additional information, such as outdoor fine dust information. When an execution event for a task in a cleaning mode is detected, the electronic device may make a control (for example, an operation of opening and closing) of a device (for example, a window) to perform a task by using the additional information, such as the outdoor fine dust information. In more detail, the window may be configured to be opened in the cleaning mode, and even if the execution event for the cleaning mode is detected, the electronic device may not perform a task in the case of a high concentration of the outdoor fine dust or may perform a task with a user's confirmation.

Figure 14:
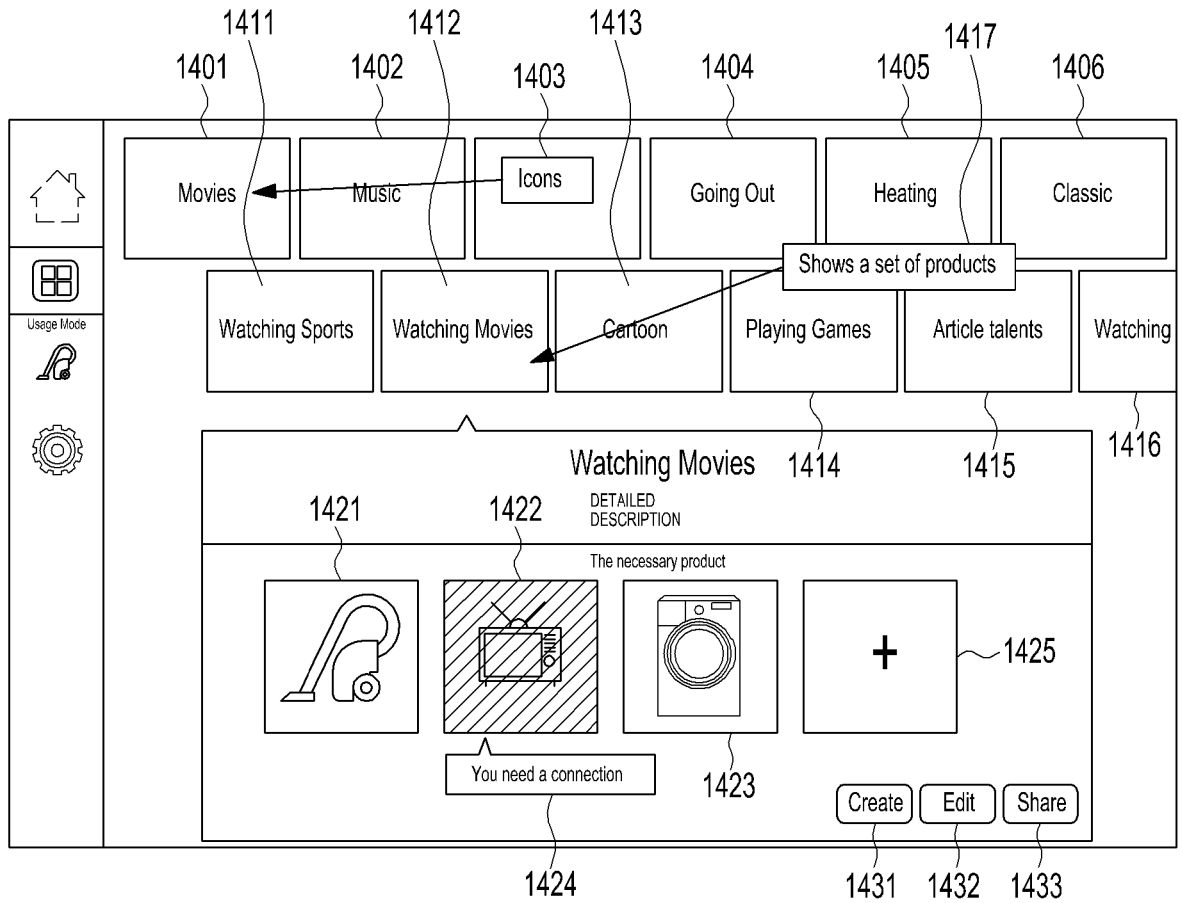
FIG. 14 illustrates a conceptual diagram of a screen that is displayed by an electronic device according to various embodiments of the present disclosure.

FIG. 14 illustrates a conceptual diagram of a screen that is displayed by an electronic device according to various embodiments of the present disclosure.

Referring to FIG. 14, the electronic device may display one or more items 1401, 1402, 1404, 1405, and 1406 of the task ontology. The items 1401, 1402, 1404, 1405, and 1406 may be modes of "Movies," "Music," "Going out," "Heating," and "Classic". Meanwhile, an icon may be displayed to replace the text of "Movies" as shown in 1403. It is assumed that the item "Movies" 1401 is selected. In FIG. 14. The electronic device may display the selected item "Movies" 1401 to be distinguished from other items that are not selected. The electronic device may display sub-items 1411, 1412, 1413, 1414, 1415, and 1416 that are configured in the sub-level of the selected item "Movies" 1401. The sub-items may include "Watching Sports" 1411, "Watching Movies" 1412, "Cartoons" 1413, "Playing Games" 1414, "Article Talents" 1415, and "Watching TV" 1416 that are related to the selected item "Movies" 1401. Meanwhile, when the sub-item 1412 is selected, a set of products 1417 may be displayed. The sub-items may be configured to be disposed in the sub-level of the item in the task ontology. The electronic device may display device information 1421, 1422, and 1423 that corresponds to the selected item (for example, 1412). The electronic device may display the device information corresponding to the item on the task ontology, or may display information on a device to perform a task when the device to perform a task is selected in advance.

The electronic device may separately display the case where a device to perform a task is selected and is connected and the case where a device to perform a task is selected and is not connected. In particular, when the device to perform a task is not connected, the electronic device may further display a message 1424 to request a connection. In addition, the electronic device may display a button 1425 to add a device to perform a task. The electronic device may display a Create button 1431, an Edit button 1432, and a Share button 1433 of a task. When the Create button 1431 is selected, the electronic device may display a screen for creating a new task. In this case, the electronic device may display a screen in which the user can select a device corresponding to a new task. When the Edit button 1432 is selected, the electronic device may display a screen for editing an existing task that is stored. In this case, the electronic device may display a screen for editing a device or for editing control information about the device. When the Share button 1433 is selected, the electronic device may share the selected task with other electronic devices, such as a server or the like.

Figure 15:
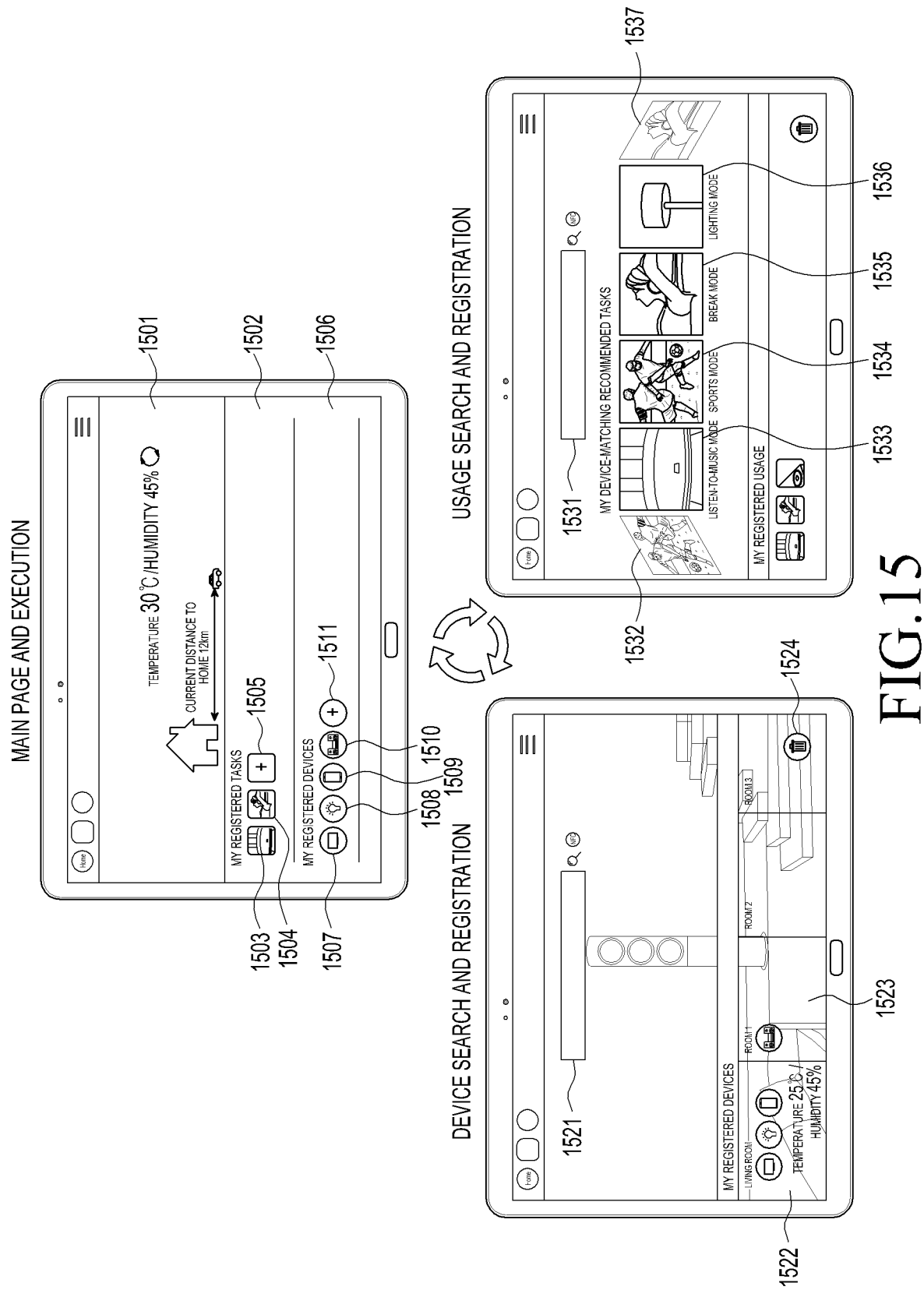
FIG. 15 illustrates conceptual diagrams for explaining a screen that is displayed by an electronic device according to various embodiments of the present disclosure.

FIG. 15 illustrates a conceptual diagram for explaining a screen that is displayed by an electronic device according to various embodiments of the present disclosure.

Referring to FIG. 15, the electronic device may display, on a main page, general information 1501 that contains the current temperature, humidity, and position information of the electronic device. The electronic device may display a registration task 1502, and may display one or more items 1503, 1504, and 1505. The electronic device may display registered devices 1506, and may display icons 1507 to 1510 indicating the devices and a device addition button 1511. Here, the electronic device may pre-register device information that is obtained as a result of discovering. Accordingly, a device to perform a task may be selected from the registered devices without discovering the devices later. As described above, the electronic device may compare the task ontology with ontology-based functions of the registered devices, and may select a device to perform a task from among the registered devices according to the comparison result.

Meanwhile, the electronic device may graphically display, on a device search and registration page, a search window 1521 for searching for a device and the current registration status of the devices. For example, the electronic device may display the registered devices by separated sections 1522 and 1523. The electronic device may display an icon 1524 for deletion.

Meanwhile, the electronic device may display, on a task search and registration page, a search window 1531 for searching for a task and recommended tasks 1532 to 1537. The recommended tasks 1532 to 1537 may be tasks that are pre-configured on the task ontology, or may be tasks that have not yet registered in the electronic device by the user. The corresponding tasks may pre-configure and include a device for performing a task, functions of the device, and control information for controlling the device. The electronic device may select one or more tasks from among the recommended tasks to then register the same. The electronic device may register the task in the electronic device itself, or may register the task in the server. In the case where the task is registered in the server, the electronic device may execute a task execution application, and may receive task information that is stored in the server in order to thereby display the registered task.

Figure 16:
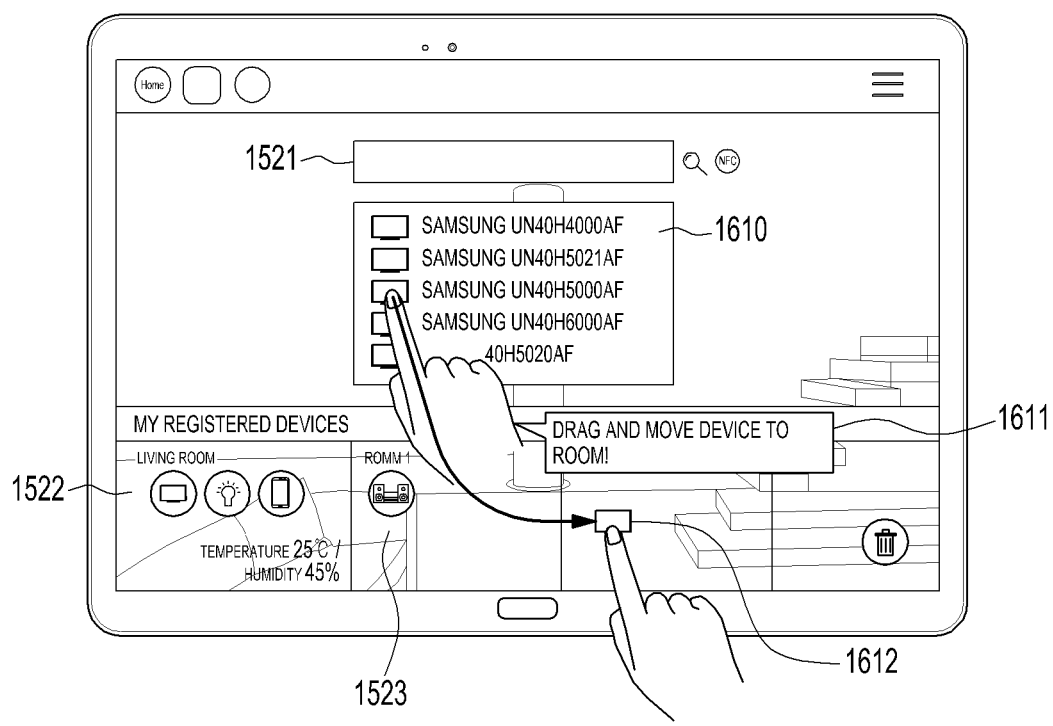
FIG. 16 illustrates a conceptual diagram for explaining a screen for registering a device according to various embodiments of the present disclosure.

FIG. 16 illustrates a conceptual diagram for explaining a screen for registering a device according to various embodiments of the present disclosure.

Referring to FIG. 16, the electronic device may display a search window 1521 for searching for a device. When text is input into the search window 1521 from the user, the electronic device may display search results 1610 that is related to the input text. When a drag is detected from one of the search results 1610 to one section for displaying a registered device, the electronic device may register the selected device in the corresponding section by moving the device to the corresponding section. Here, the section may be determined by the position that is defined by the user. For example, if the user configures the places, such as a living room or rooms, as sections, the electronic device may map the registered devices with the corresponding sections to then be stored. Meanwhile, as another example, the sections may be configured by the tasks (for example, a cleaning mode) that are configured by the user, and the type of section is not limited. The electronic device may display a message

1611 to induce a drag. According to this, the user may register his/her own device in the electronic device. The electronic device may display an icon 1612 in response to a drag.

Figure 17:
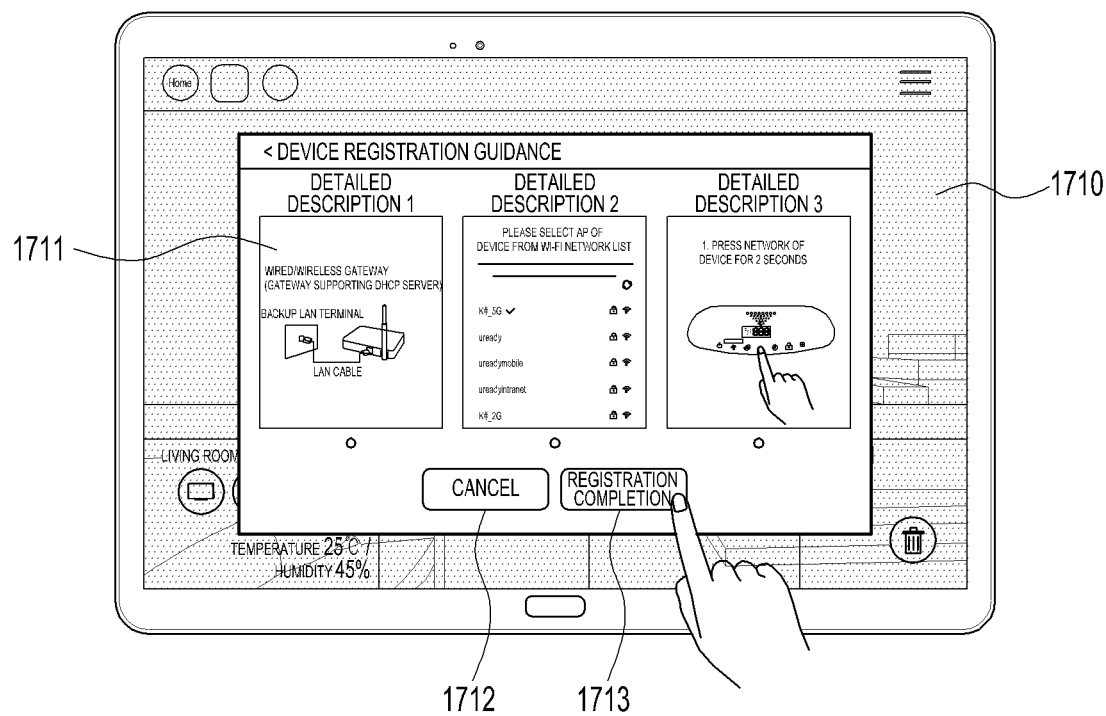
FIG. 17 illustrates a conceptual diagram for explaining a screen of a device registration guidance according to various embodiments of the present disclosure.

FIG. 17 illustrates a conceptual diagram for explaining a screen of a device registration guidance according to various embodiments of the present disclosure.

Referring to FIG. 17, the electronic device may display a screen 1710 that explains a method for registering various types of devices, and the user may register a device with the help of the screen 1710. The screen 1710 may contain information 1711 that explains a connection in detail. Furthermore, the electronic device may display a registration cancellation button 1712 and a registration completion button 1713. As described above, the electronic device may register a device in the electronic device itself or in the server.

Figure 18A:
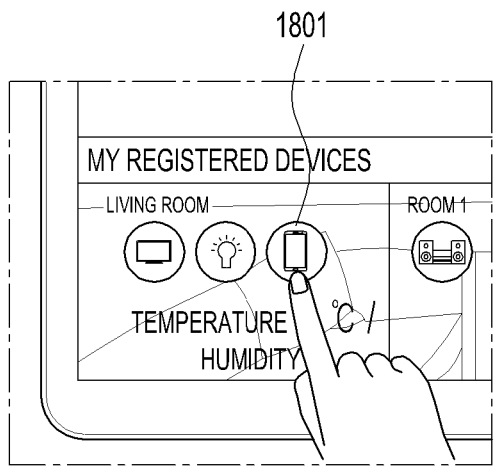
FIGS. 18A, 18B, and 18C illustrate conceptual diagrams of a screen that may indicate whether or not a device is registered according to various embodiments of the present disclosure.
Figure 18B:
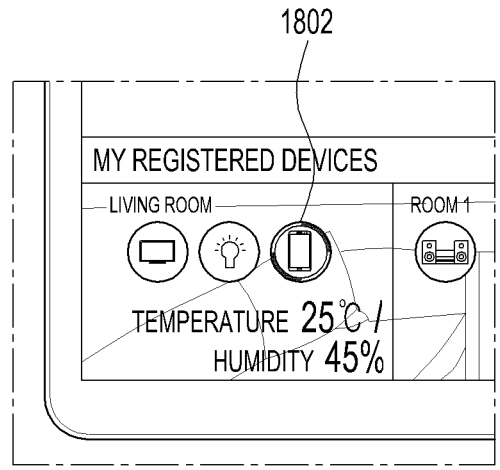
Figure 18C:
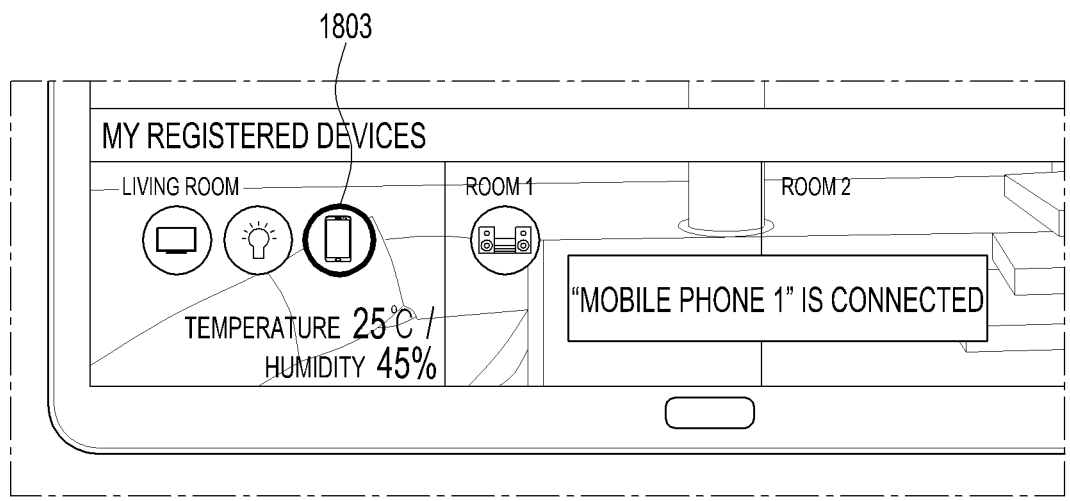

FIGS. 18A, 18B, and 18C illustrate conceptual diagrams of a screen that may indicate whether or not a device is registered according to various embodiments of the present disclosure.

Referring to FIGS. 18A to 18C, the electronic device may display an icon to be distinguished depending on whether or not a device is connected. For example, when a mobile phone is not connected, the electronic device may display a mobile phone icon 1801 in the first color. In addition, in response to a user's click, the electronic device may register a mobile phone, and may display an animation 1802 indicating that the registration is in progress. When the registration of the mobile phone is completed, the electronic device may display a mobile phone icon 1803 in the second color.

Figure 19:
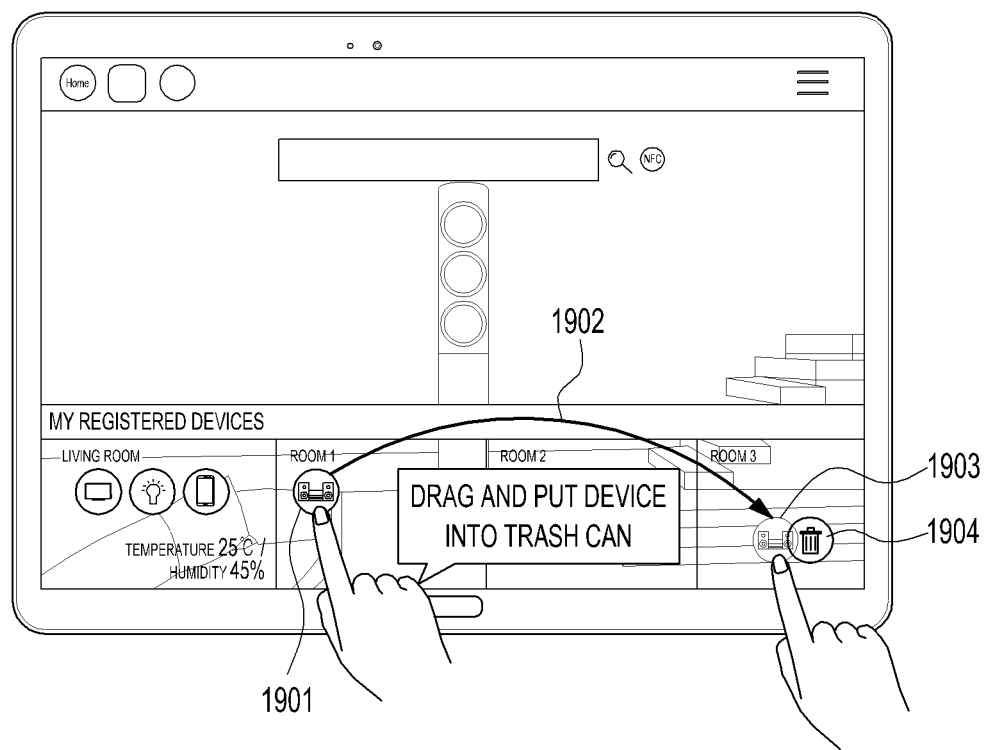
FIG. 19 illustrates a conceptual diagram for explaining a process of deleting a registered device according to various embodiments of the present disclosure.

FIG. 19 illustrates a conceptual diagram for explaining a process of deleting a registered device according to various embodiments of the present disclosure.

Referring to FIG. 19, the electronic device may detect a drag 1902 from an icon 1901 of a registered device to an icon 1904 for deletion. The electronic device may pre-configure the drag 1902 to the icon 1904 for deletion as an instruction for deleting a registered device. In response to the detection of the drag 1902, the electronic device may display the selected icon 1903 while moving the same according to the point of the drag 1902, and may not display the corresponding icon 1903 if a drop is detected on the icon 1904 for deletion. Furthermore, the electronic device may delete, from a registration list, the device that has been registered and that corresponds to the icon 1903.

Figure 20A:
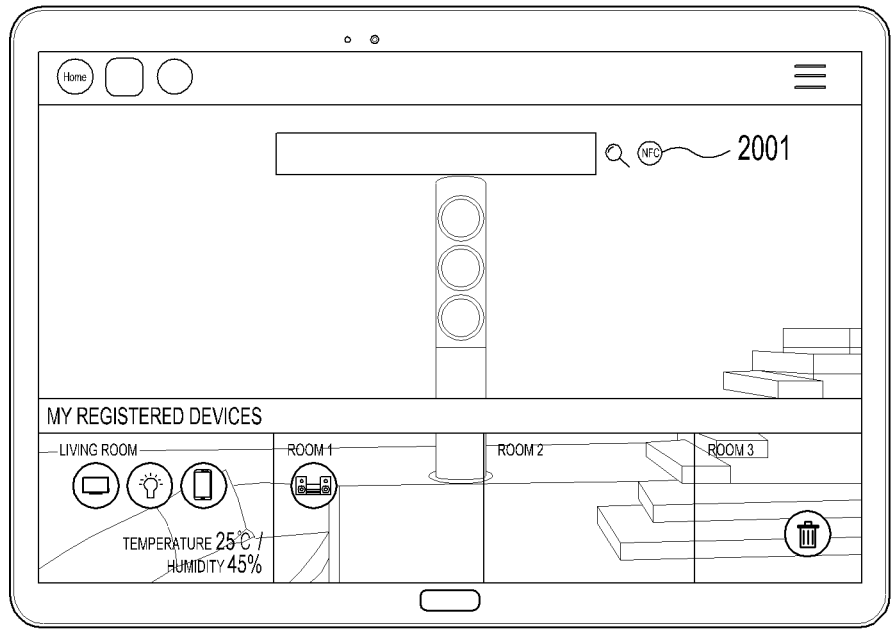
FIGS. 20A and 20B illustrate conceptual diagrams of a screen for searching for devices through near field communication (NFC) according to various embodiments of the present disclosure.
Figure 20B:
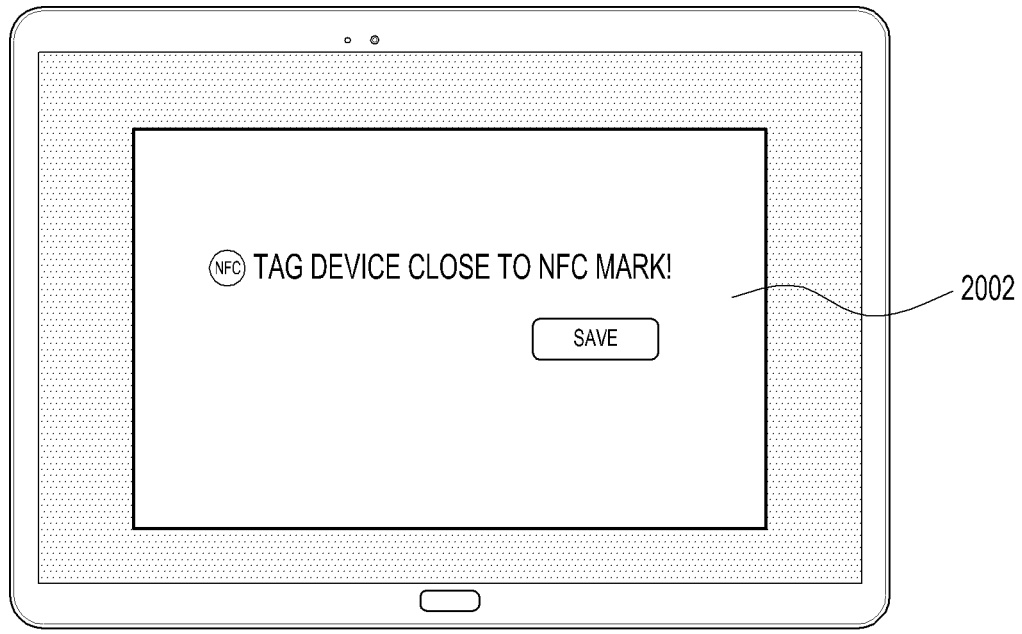

FIGS. 20A and 20B illustrate conceptual diagrams of a screen for searching for a device through NFC according to various embodiments of the present disclosure.

Referring to FIGS. 20A and 20B, the electronic device may display a button 2001 for searching for NFC. When the button 2001 for searching for NFC is selected, the electronic device may perform discovery of a device by using NFC. The electronic device may display a message 2002 stating that the discovery will be performed, and may discover a device that has an NFC tag. When a device having a specific NFC tag is discovered, the electronic device may register the discovered device.

Figure 21:
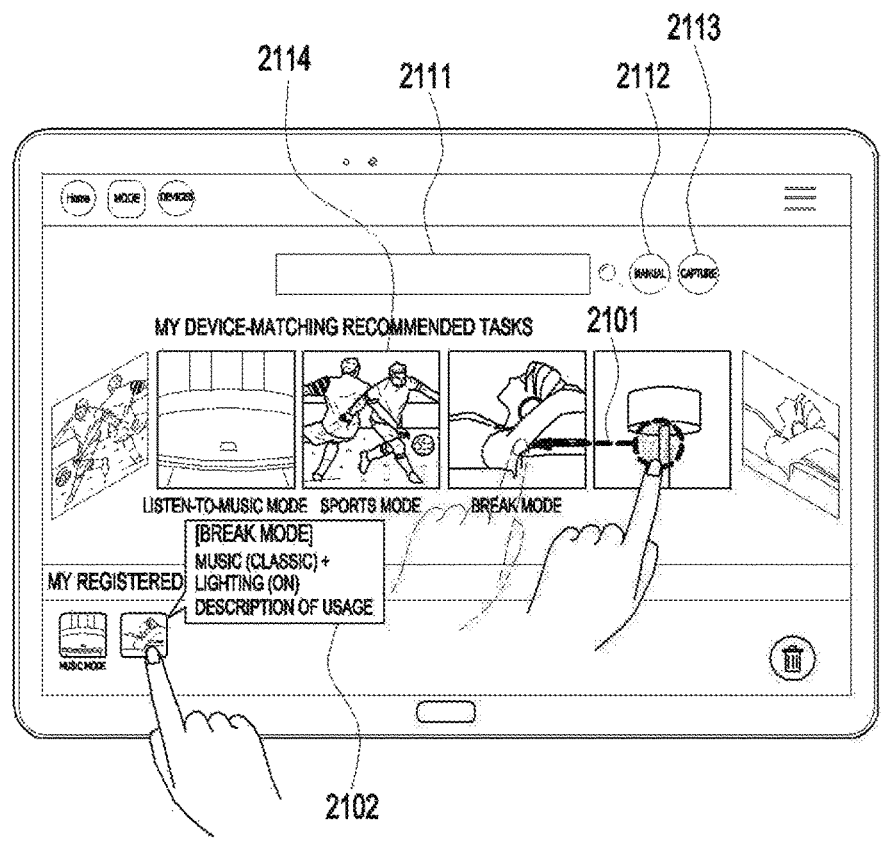
FIG. 21 illustrates a conceptual diagram of a screen for performing a task search and registration according to various embodiments of the present disclosure.

FIG. 21 illustrates a conceptual diagram of a screen for performing a task search and registration according to various embodiments of the present disclosure.

Referring to FIG. 21, the electronic device may display a search window 2111 for a task search, a button 2112 for creating a manual task, and a button 2113 for creating a capture task.

The electronic device may analyze the text that is input into the search window 2111 for a task search, and may display a recommended task corresponding to the analysis result. Here, the recommended task may mean a task in which device information, corresponding function information, and control information are pre-configured. For example, a task of sports mode 2114 may be a recommended task, and a task ontology may be pre-configured, which states that a TV supporting the 3D function and Wi-Fi and a speaker supporting Dolby digital 5.1 are required, in the sports mode 2114. In addition, control information of the TV and control information of the speaker in the sports mode 2114 may be pre-configured as well. When the recommended task is selected, the electronic device may compare the semantic information-based ontology of the selected task with the ontology of the registered device, and may select a device to perform a task based on the comparison result. When the button 2112 for creating a manual task is selected, the electronic device may provide a screen (that is, a user interface) for creating a task. The user may directly input device information, function information, and control information that are required for a specific task. According to this, a task may be created, and a semantic information-based task ontology may be created as well. When the button for creating a capture task, the electronic device may store control information and function information of the device that is currently connected while relating the same with each other in order to thereby create a task. Accordingly, a semantic information-based task ontology may be created as well.

The electronic device may display a recommended task list 2114, and may display a navigation result of the recommended task list 2114 based on a navigation instruction (for example, a drag 2101). Meanwhile, in response to the selection for the registration task, the electronic device may display a description 2102 for the task.

Figure 22:
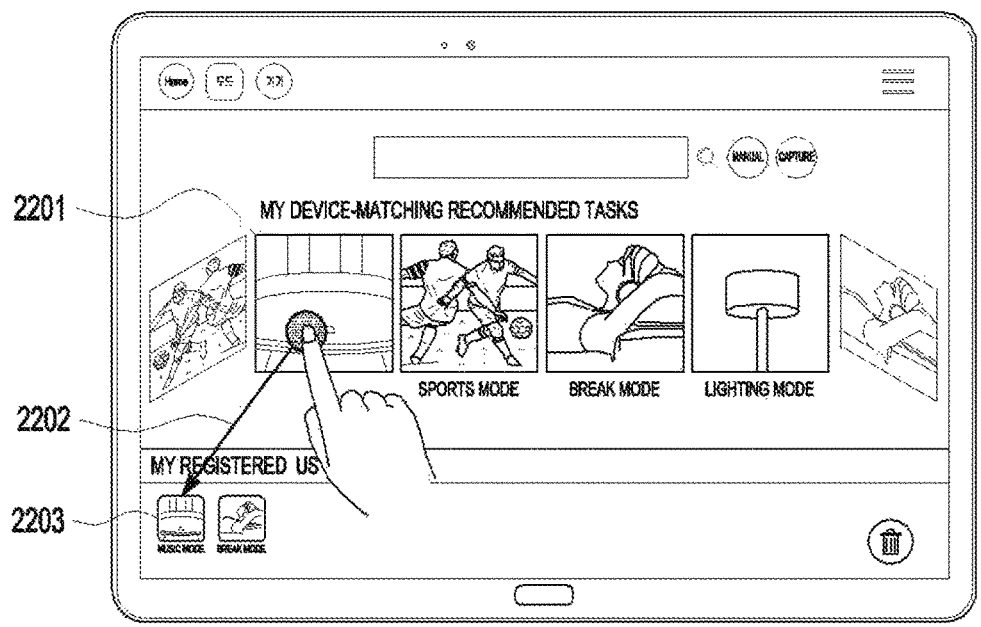
FIG. 22 illustrates a conceptual diagram for explaining a selection for a recommended task according to various embodiments of the present disclosure.

FIG. 22 illustrates a conceptual diagram for explaining the selection of a recommended task according to various embodiments of the present disclosure.

Referring to FIG. 22, the electronic device may detect a drag 2202 from one of the recommended tasks 2201 to the registration task area, and may register the corresponding task in response thereto. The electronic device may display an icon 2203 corresponding to the registered task in the registration task area.

Figure 23:
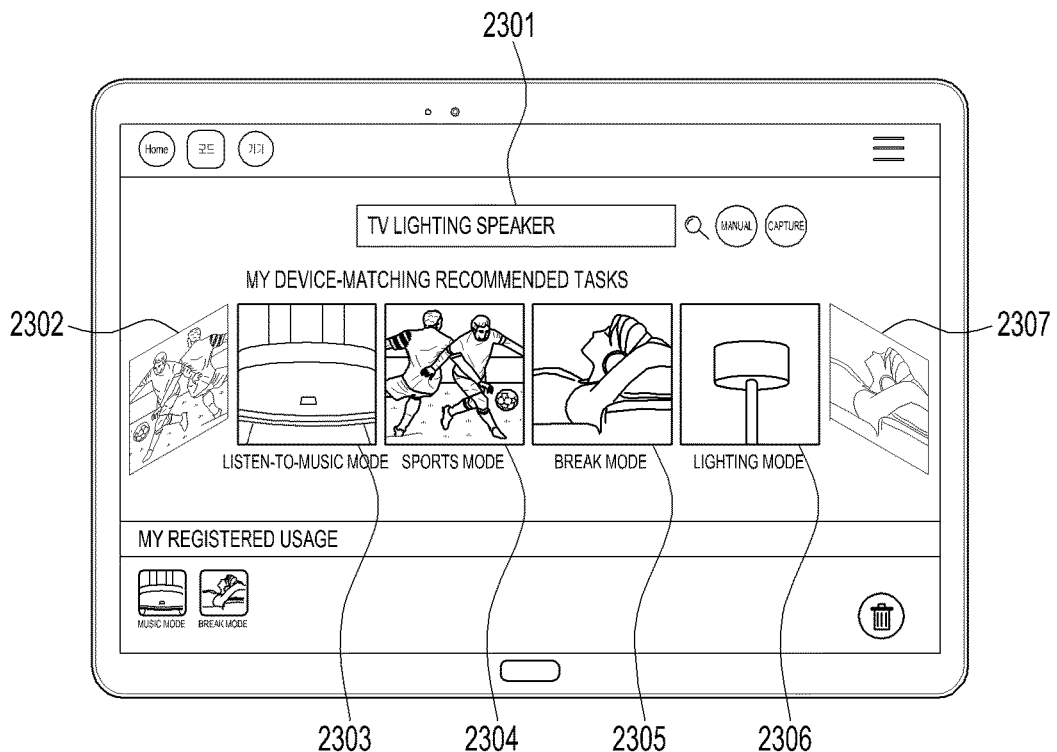
FIG. 23 illustrates a conceptual diagram for explaining a task search through an input into a search window according to various embodiments of the present disclosure.

FIG. 23 illustrates a conceptual diagram for explaining a task search through an input into a search window according to various embodiments of the present disclosure.

Referring to FIG. 23, the user may input the text "TV Lighting Speaker" 2301 into the search window. The electronic device may recognize a space between the text "TV" and the text "Lighting," and may recognize two terms above as different words. The electronic device may display recommended tasks 2302 to 2307 that satisfy the input text. The electronic device may compare semantic information on devices of the recommended tasks with the input text based on semantic information, and may select and display a recommended task that corresponds to the text according to the comparison result. Meanwhile, when a plurality of words are input, the electronic device may compare a combination of a plurality of words with the semantic information about devices of the recommended tasks, and may select and display a recommended task that corresponds to the text. Meanwhile, in various embodiments of the present disclosure, the electronic device may receive an input of text "3D," "Wi-Fi," or the like, and, in this case, the electronic device may compare the same with the task ontology of the recommended tasks, and may select and display a recommended task that corresponds to the text.

Figure 24:
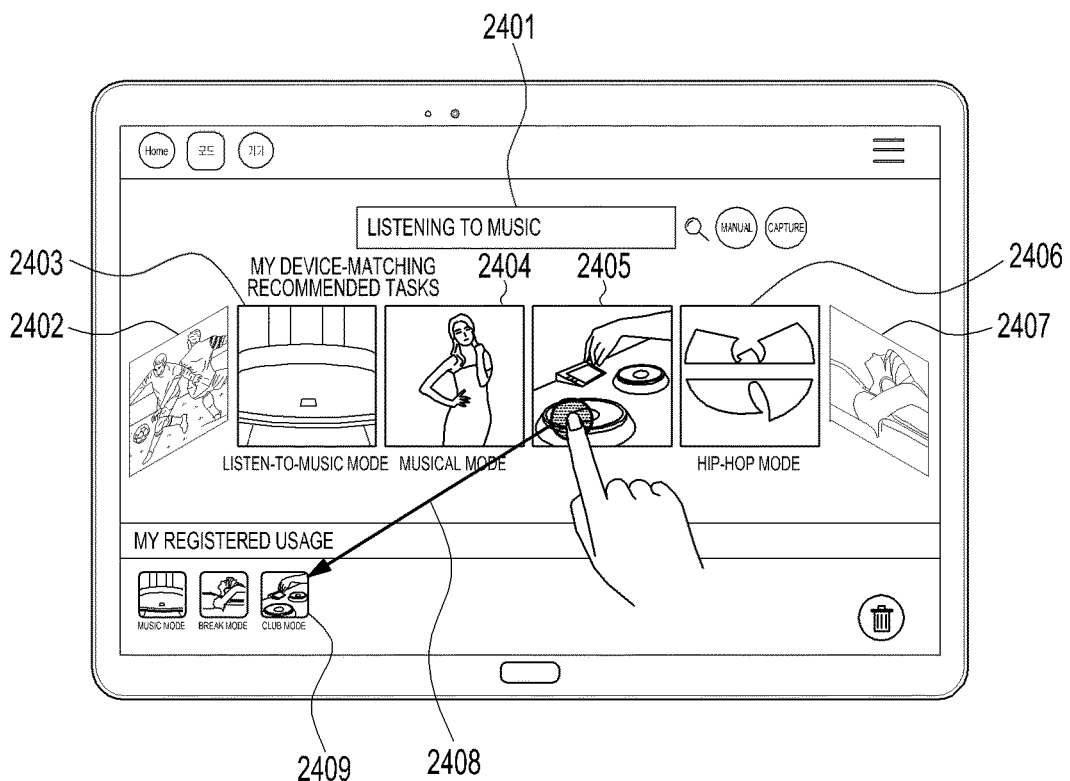
FIG. 24 illustrates a conceptual diagram of a screen for explaining a process of registering a recommended task according to various embodiments of the present disclosure.

FIG. 24 illustrates conceptual diagram of a screen for explaining a process of registering a recommended task according to various embodiments of the present disclosure.

Referring to FIG. 24, the electronic device may receive an input of the text "Listening to music" 2401 through a search window. The electronic device may compare the text "Listening to music" 2401 with a task ontology of pre-stored tasks based on semantic information, and may select and display recommended tasks 2402 to 2407 that correspond to the text "Listening to music" according thereto. The electronic device may detect a drag 2408 from one 2405 of the recommended tasks to the registration task area, and may register the corresponding recommended task in response thereto. In addition, the electronic device may display an icon 2409 for the registered task in the registration task area.

Figure 25A:
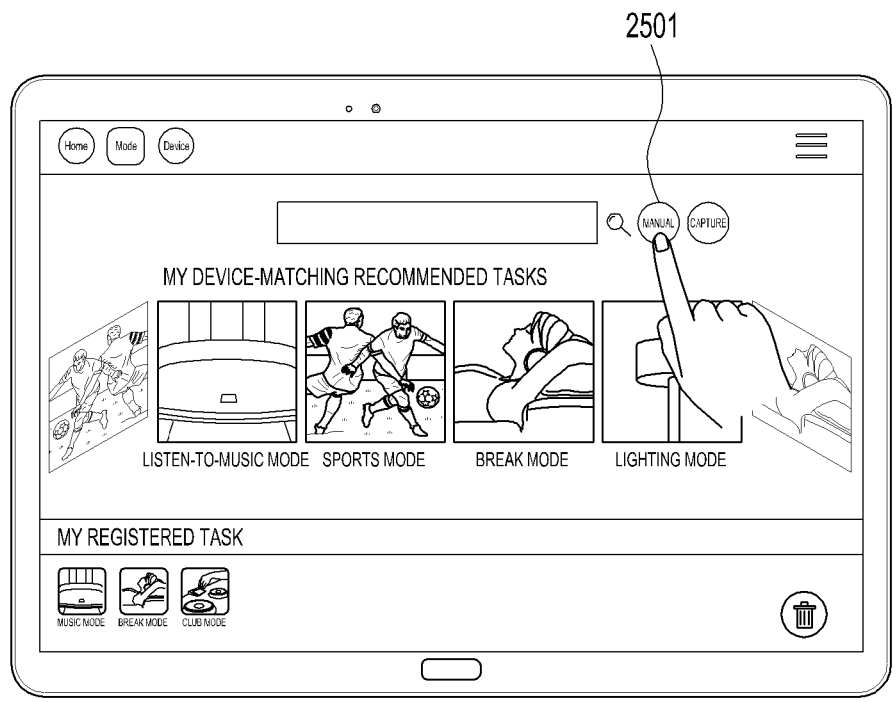
FIGS. 25A, 25B, and 25C illustrate conceptual diagrams of a screen for explaining a manual task registration according to various embodiments of the present disclosure.
Figure 25B:
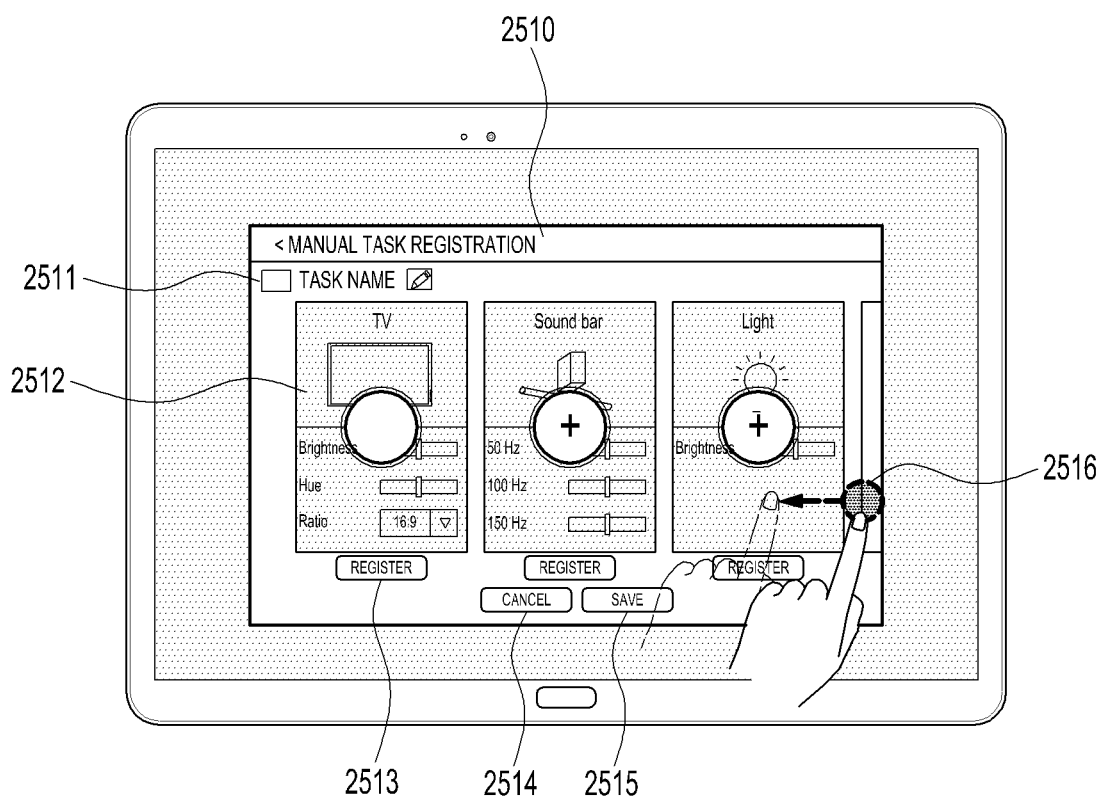
Figure 25C:
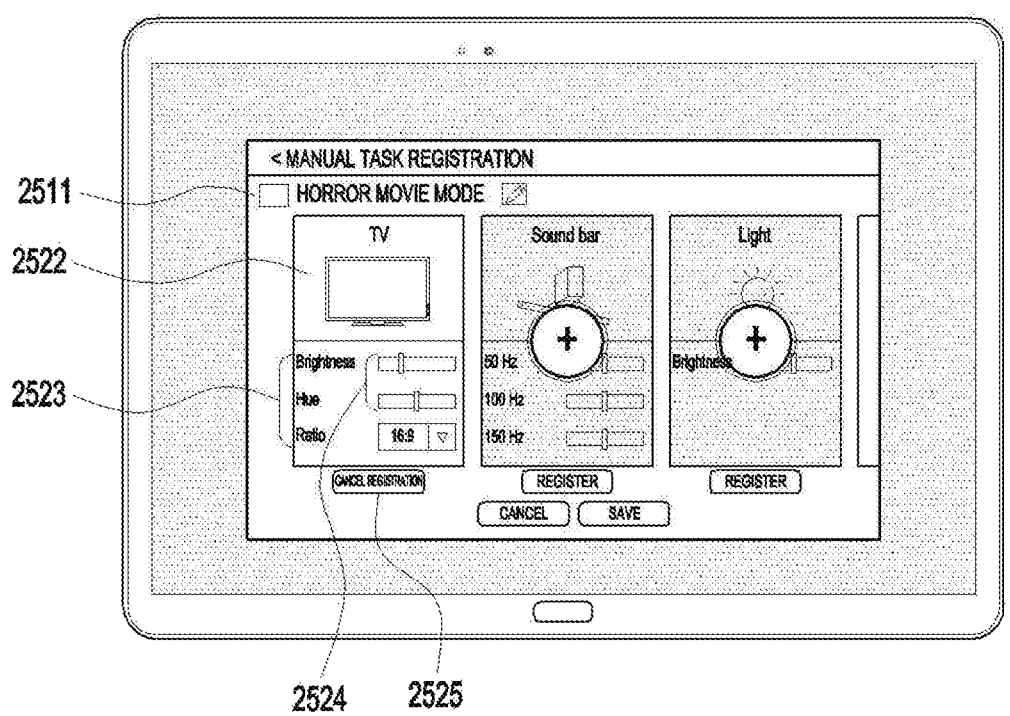

FIGS. 25A, 25B, and 25C illustrate conceptual diagrams of a screen for explaining a manual task registration according to various embodiments of the present disclosure.

Referring to FIG. 25A, the electronic device may detect a touch 2501 on a button for creating a manual task. Referring to FIG. 25B, the electronic device may display a screen 2510 for creating a manual task. The screen 2510 for creating a manual task, according to various embodiments of the present disclosure, may include an input window 2511 for inputting a task name, an object 2512 for adding devices, a registration confirmation button 2513, a cancellation button 2514, and a storage button 2515. Meanwhile, the electronic device may display a result in which a device list is navigated left or right in response to a navigation instruction (for example, a drag 2516). When the object 2512 for adding devices is selected, the electronic device may display a device 2522 and a screen 2523 and 2524 through which control information may be input as shown in FIG. 25C. When the registration confirmation button 2513 is selected, the device and control information may be registered in the corresponding task, and the registration confirmation button 2513 may be changed to the registration cancellation button 2525 to then be displayed. When the storage button 2515 is selected, the electronic device may register the device and control information in the corresponding task. Meanwhile, although it is not shown in the drawings, in the process of creating the manual task, the electronic device may further display a screen for selecting function information (for example, function information, such as 3D or Wi-Fi) of a device, and may store the corresponding function information to be related to the task based on a user input in order to thereby create the task ontology.

Figure 26A:
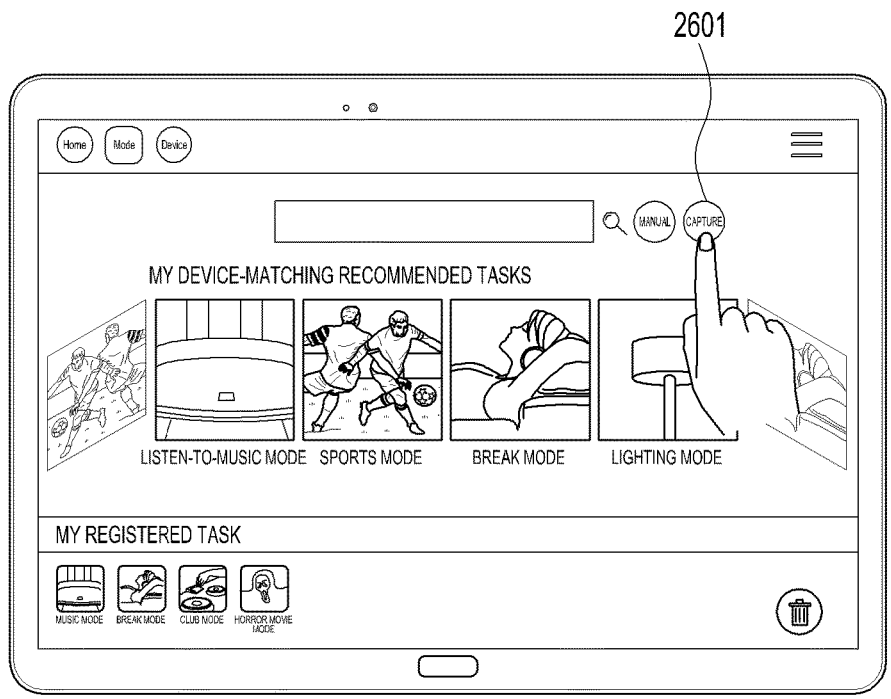
FIGS. 26A and 26B illustrate conceptual diagrams of a screen for explaining a capture registration of a task according to various embodiments of the present disclosure.
Figure 26B:
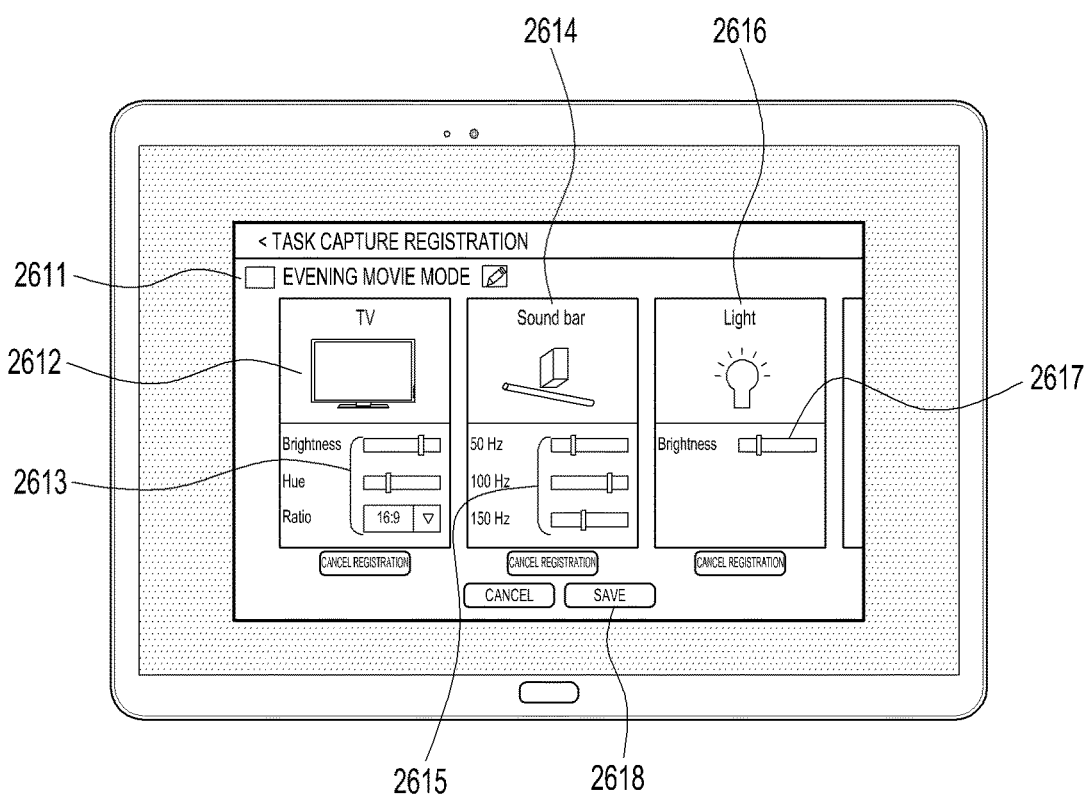

FIGS. 26A and 26B illustrate conceptual diagrams of a screen for explaining a capture registration of a task according to various embodiments of the present disclosure.

Referring to FIG. 26A, the electronic device may detect a touch 2601 on a button for creating a capture task. Referring to FIG. 26B, the electronic device may display an input window 2611 for inputting a task name. The electronic device may determine a task name by the text that is input into the input window 2611. The electronic device may display devices 2612, 2614, and 2616 that are currently connected to the electronic device, and may display control information 2613, 2615, and 2617 of the devices. When a storage button 2618 is selected, the electronic device may create a task that includes a device and control information. Furthermore, the electronic device may obtain function information based on semantic information with reference to the specifications of the devices that are currently connected in order to thereby create a semantic information-based task ontology.

Figure 27A:
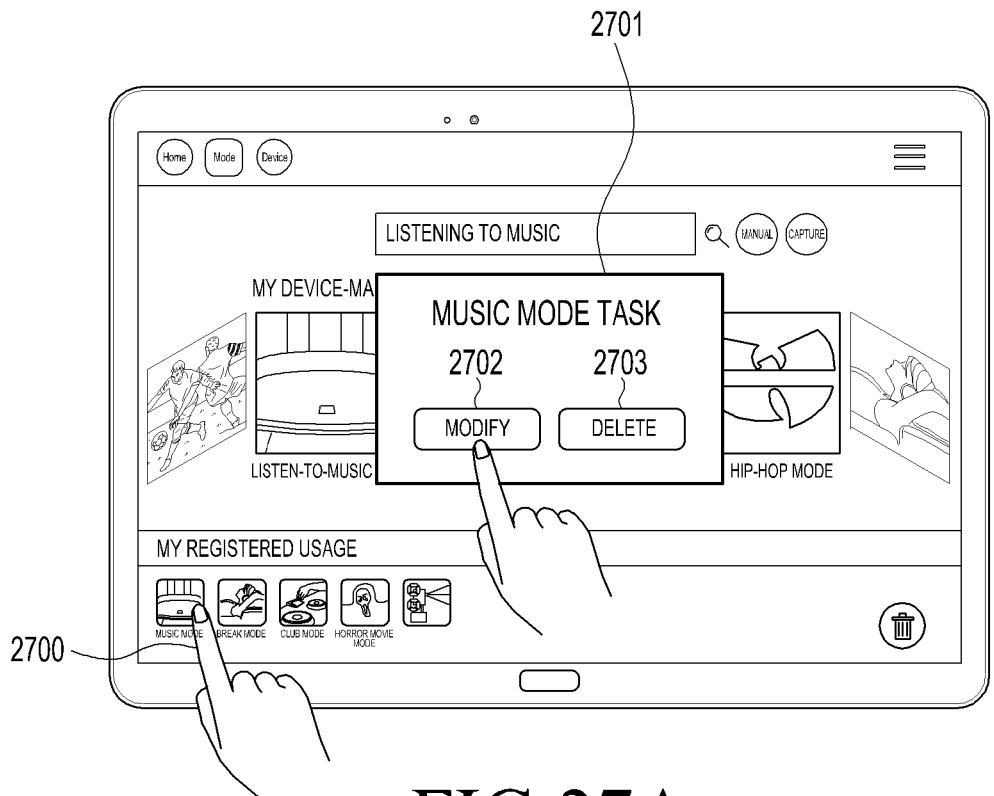
FIGS. 27A and 27B illustrate conceptual diagrams of a screen for modifying a task according to various embodiments of the present disclosure.
Figure 27B:
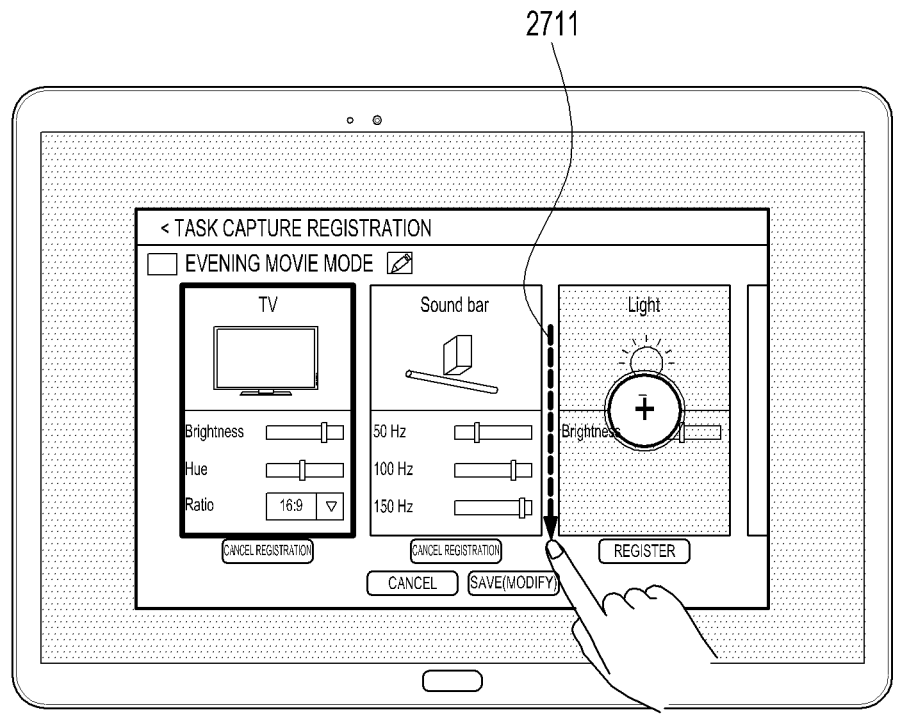

FIGS. 27A and 27B illustrate conceptual diagrams of a screen for modifying a task according to various embodiments of the present disclosure.

Referring to FIG. 27A, when a long press is detected on an icon 2700 of the registered task, the electronic device may display a window 2701 to ask whether or not to modify the task. The window 2701 to ask whether or not to modify the task may include a modification button 2702 and a delete button 2703. When the modification button 2702 is selected, the electronic device may display a screen for editing the correspond task as shown in FIG. 27B. The electronic device may modify at least one of the control information, the device information, or the function information of the task based on an editing instruction with respect to the corresponding task. Meanwhile, in the case where a number of pieces of control information are contained so as not to be displayed in a single screen of the device, the screen may be navigated based on a drag 2711 in the vertical direction to then be displayed.

Figure 28:
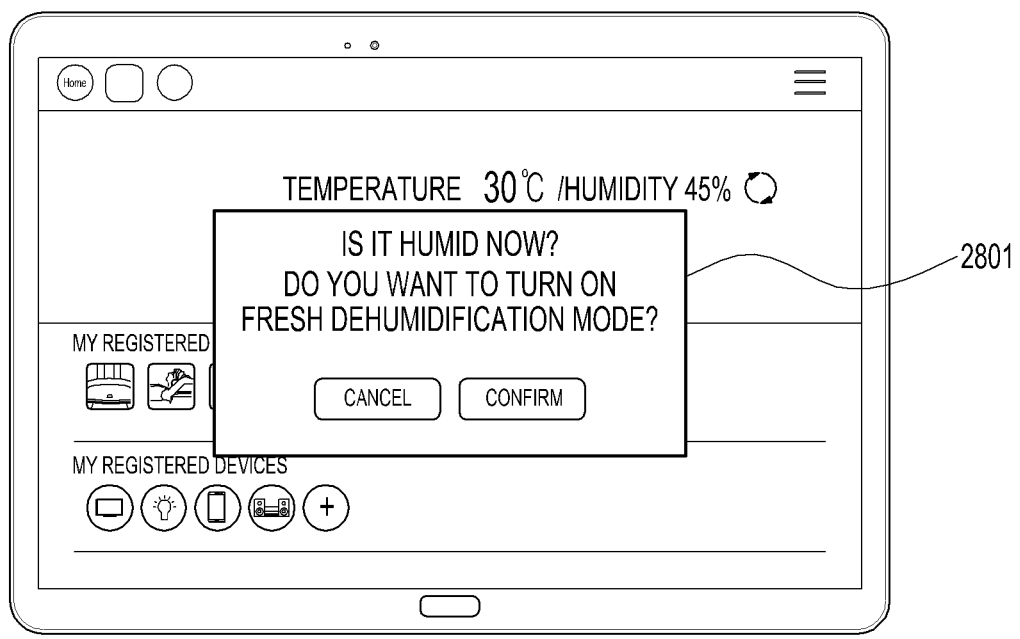
FIG. 28 illustrates a conceptual diagram for explaining a screen for an execution of a recommendation according to various embodiments of the present disclosure.

FIG. 28 illustrates a conceptual diagram for explaining a screen for an execution of recommendation according to various embodiments of the present disclosure.

Referring to FIG. 28, the electronic device may pre-configure a trigger for each task. For example, the electronic device may pre-configure, as a trigger for executing a task of "Dehumidification mode," the case in which the humidity exceeds a predetermined threshold value. The electronic device may monitor the surroundings in order to thereby determine whether or not the trigger is detected, and when the trigger is detected, the electronic device may display a window 2801 to ask whether or not to perform the corresponding task.

Figure 29:
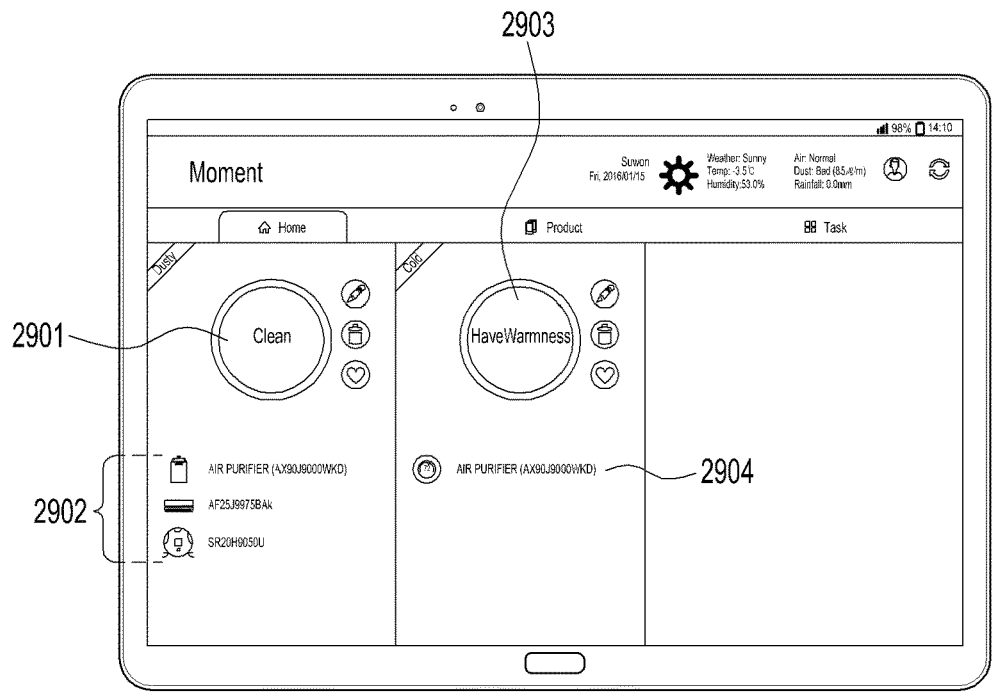
FIG. 29 illustrates a conceptual diagram for explaining a screen configuration according to various embodiments of the present disclosure.

FIG. 29 illustrates a conceptual diagram for explaining a screen configuration according to various embodiments of the present disclosure.

Referring to FIG. 29, the electronic device may display one or more items 2901 and 2903 of the task in the home screen. For example, the electronic device may include an item "Clean" mode 2901 and an item "Havewarmness" mode 2903. The electronic device may select a device to perform the corresponding task. For example, the electronic device may determine device information and function information that correspond to the "Clean" mode 2901 by using the task ontology. Furthermore, the electronic device may determine function information of a discovered device or registered device by using the product information ontology. The electronic device may compare the task ontology with the product information ontology based on semantic information, and may select, as a device to perform the "Clean" mode 2901, an air purifier of AX90J9000WKD and devices 2902 of AF25J99758AK and SR20H9050U. The electronic device may display information on the devices 2902 to perform the task. Furthermore, the electronic device may also display information on the thermostat 2904 of T3007ES that is selected as a device to perform the "Havewarmness" mode 2903. The electronic device may discover the devices of AX90J9000WKD, AF25J99758AK, SR20H9050U, and T3007ES at the time of calling the task, or may discover the same in advance to then be registered.

Figure 30:
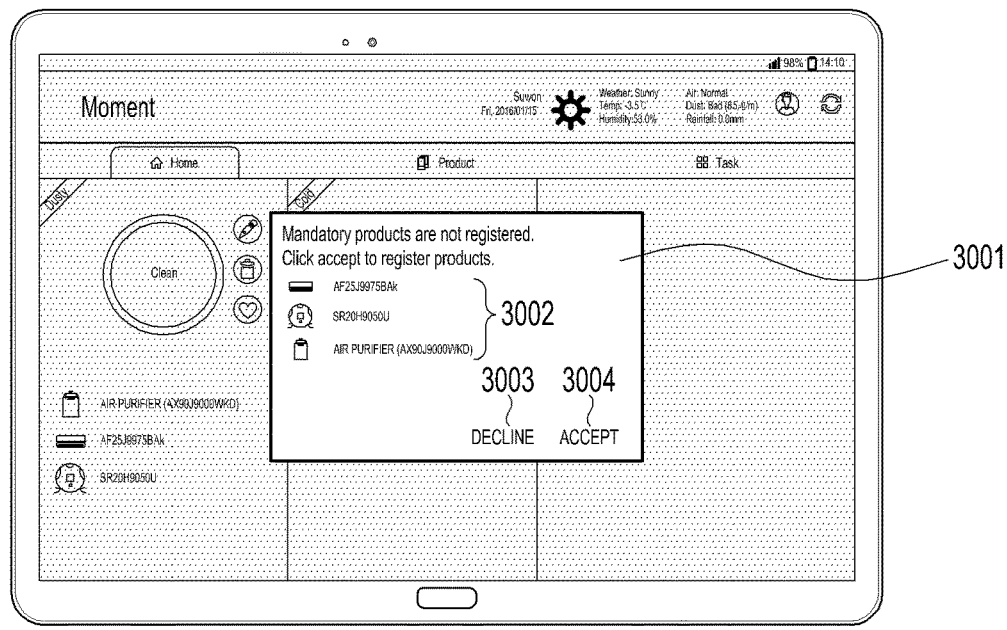
FIG. 30 illustrates a conceptual diagram for explaining a process of registering a device to perform a task according to various embodiments of the present disclosure.

FIG. 30 illustrates a conceptual diagram for explaining a process of registering a device to perform a task according to various embodiments of the present disclosure.

Referring to FIG. 30, the electronic device may compare the semantic information that is related to one or more items that are selected from among the tasks with the semantic information of a device that is discovered or is pre-registered. The electronic device may select a device to perform a task based on the semantic information-based comparison result. For example, in FIG. 30, the electronic device may determine the air purifier of AX90J9000WKD, AF25J99758AK, and SR20H9050U to be devices to perform a task. The electronic device may display a window 3001 to ask whether or not the registration is to be made, which includes information 3002 on the determined device to perform a task, a registration refusal button 3003, and a registration approval button 3004. When the selection for the registration approval button 3004 is detected, the electronic device may register a device to perform a task, and when a task execution instruction is detected later, the electronic device may transmit a control instruction to the devices to perform a task.

Figure 31A:
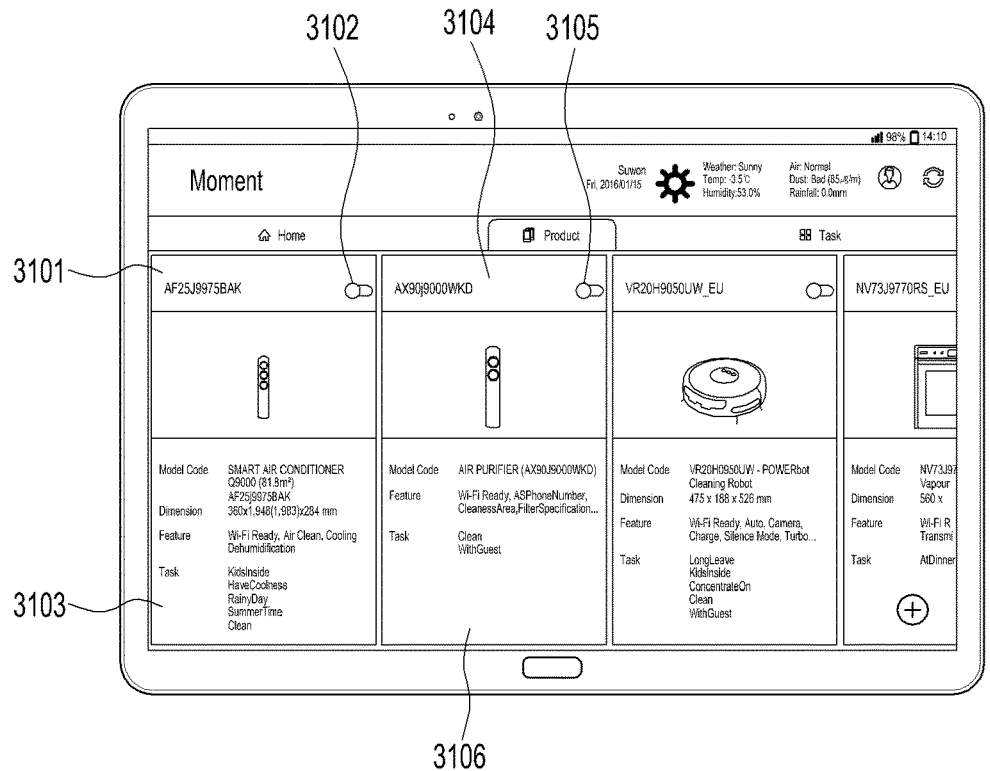
FIGS. 31A, 31B, and 31C illustrate conceptual diagrams for explaining a device registration according to various embodiments of the present disclosure.
Figure 31B:
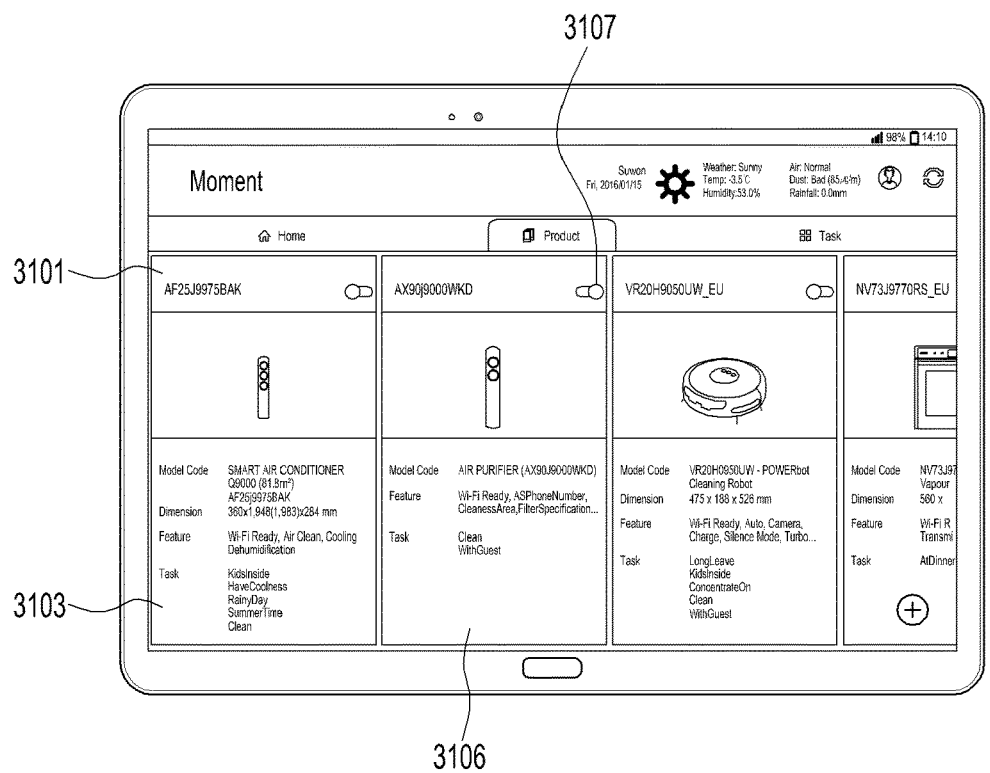
Figure 31C:
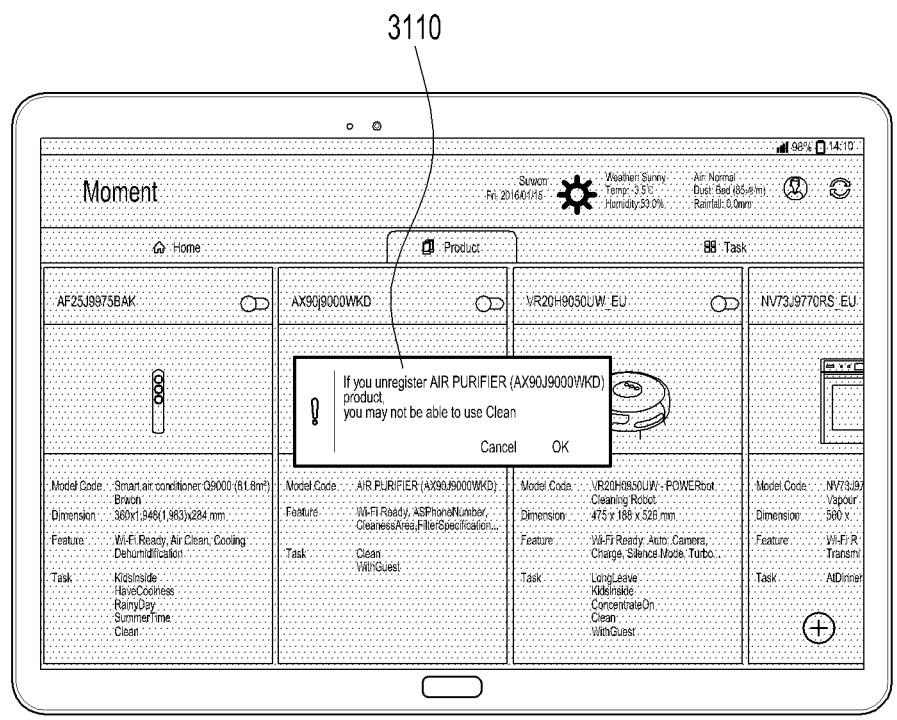

FIGS. 31A, 31B, and 31C illustrate conceptual diagrams for explaining a device registration according to various embodiments of the present disclosure.

Referring to FIG. 31A, the electronic device may display pre-registered devices 3101 and 3104. The electronic device may pre-register the devices by discovering the same or based on a user's manual input. The electronic device may display semantic information-based specification information 3103 and 3106 about the registered devices. In addition, the electronic device may display toggles 3102 and 3105 that may turn on/off the activation of the registered devices. As shown in FIG. 31B, the user may put the toggle into the off-state 3107, and the electronic device may deactivate the corresponding device in response thereto. Meanwhile, when a specific device is determined to be deactivated and is determined to not perform a specific task, the electronic device may display a window 3110 stating that a specific task cannot be performed as shown in FIG. 31C.

Figure 32A:
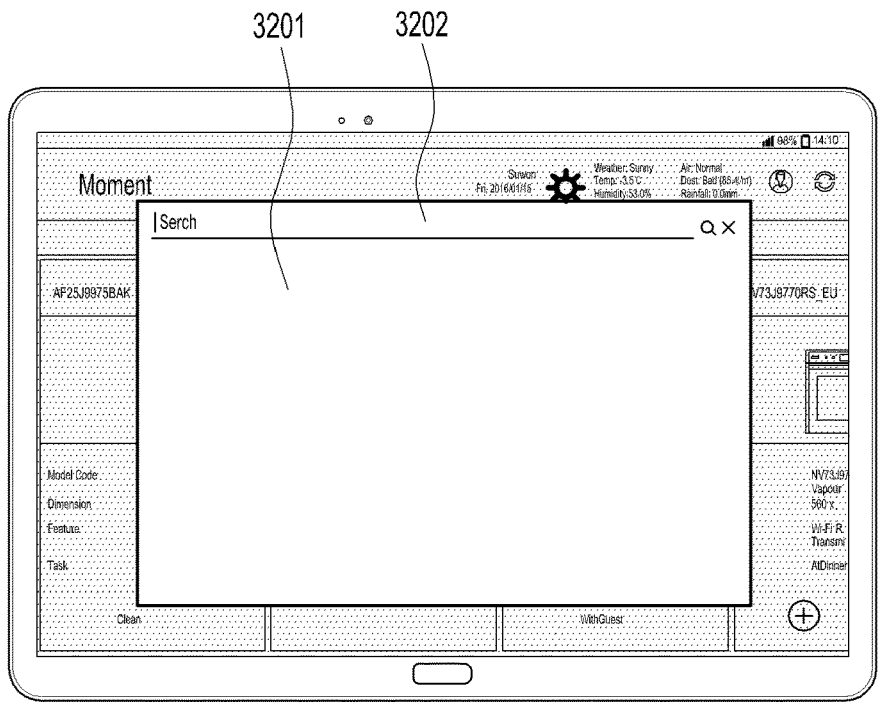
FIGS. 32A and 32B illustrate conceptual diagrams for explaining a device search according to various embodiments of the present disclosure.
Figure 32B:
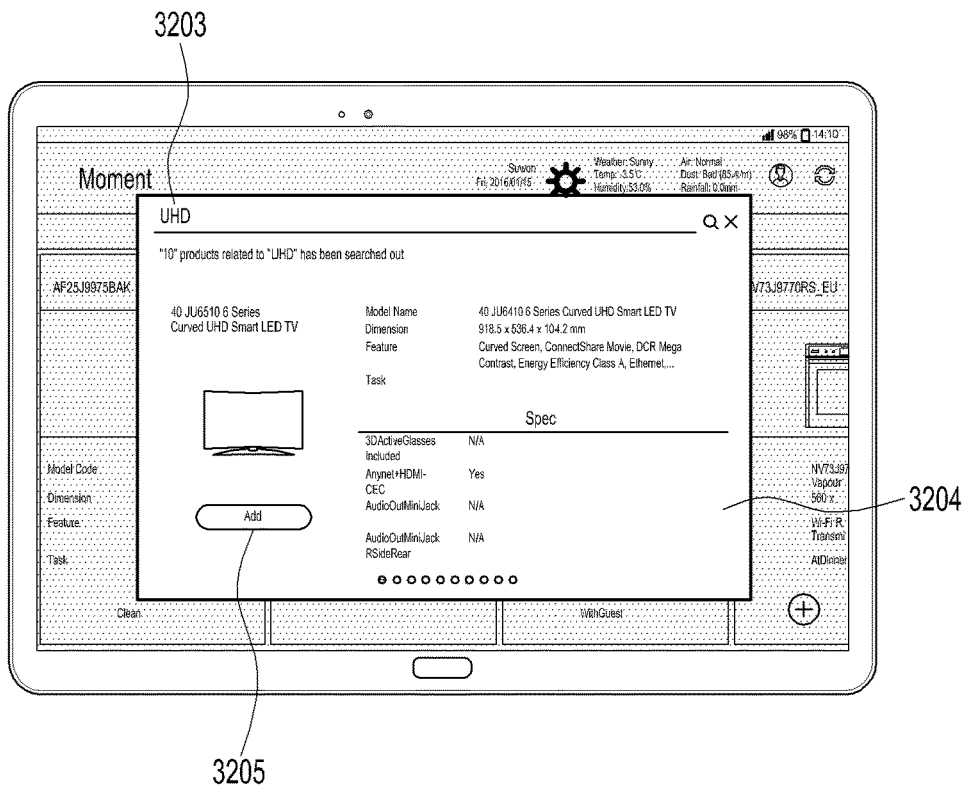

FIGS. 32A and 32B illustrate conceptual diagrams for explaining a device search according to various embodiments of the present disclosure.

Referring to FIG. 32A, when a device search request is detected, the electronic device may display a device search object 3201. The device search object 3201 may include an input window 3202 to input text for a device search. As shown in FIG. 32B, when the text 3203 is input into the input window 3202, the electronic device may compare the input text 3203 with the product information ontology based on semantic information, and may display information 3204 of the searched device according to the comparison result. When a registration button 3205 is selected, the electronic device may register the searched device, and may use the same as a candidate device to perform a specific task later.

Figure 33A:
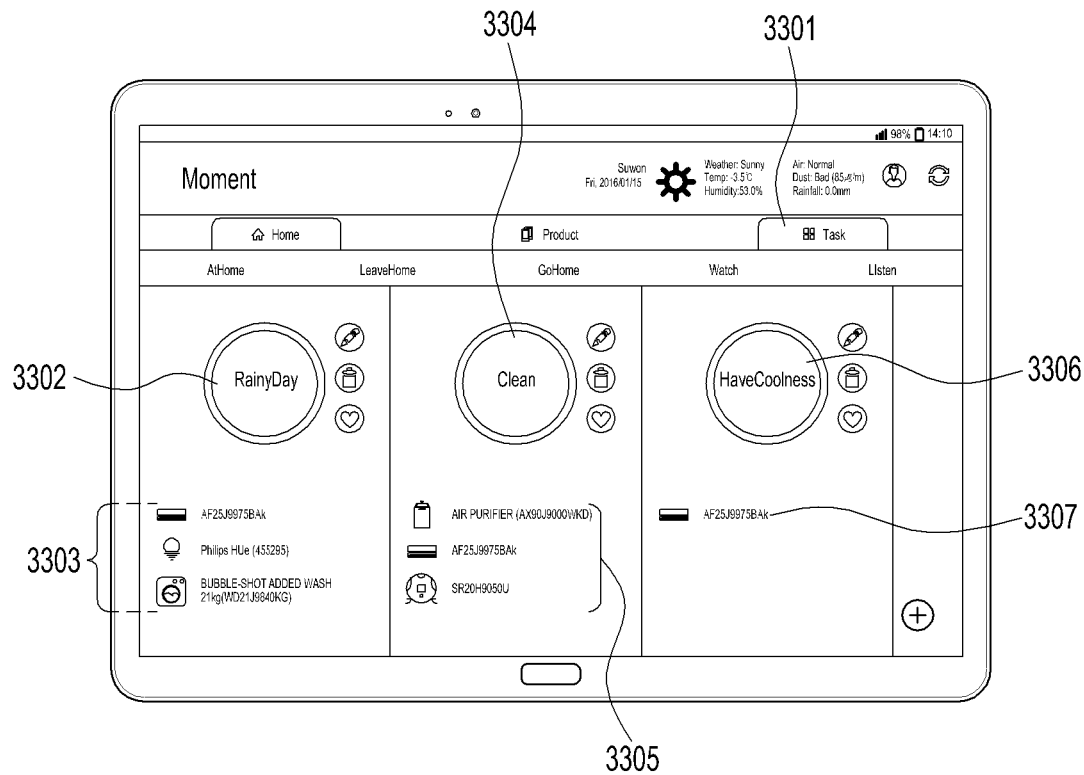
FIGS. 33A, 33B, and 33C illustrate conceptual diagrams of a task screen according to various embodiments of the present disclosure.
Figure 33B:
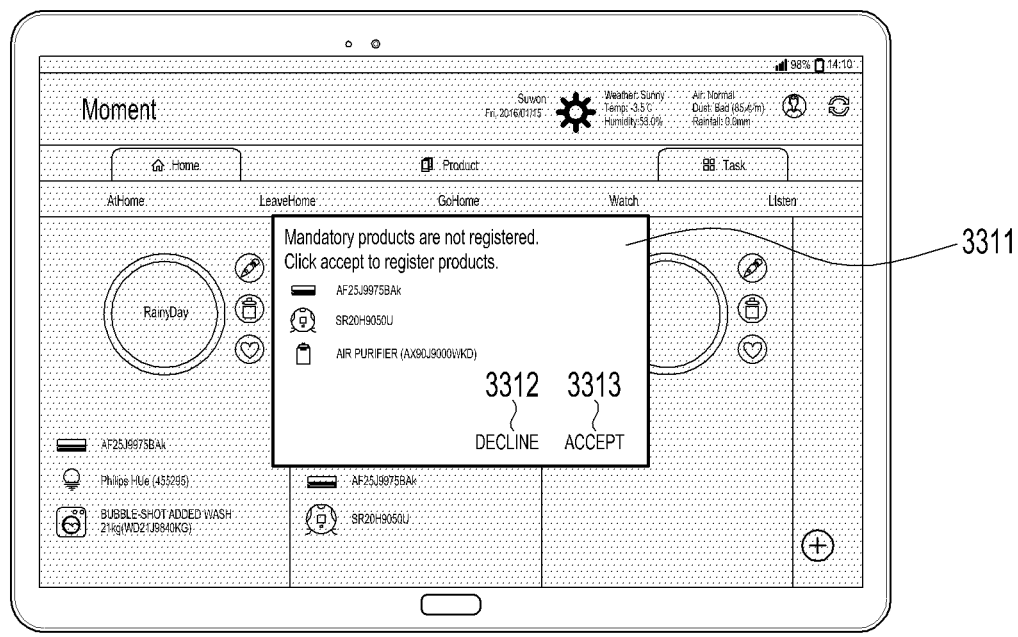
Figure 33C:
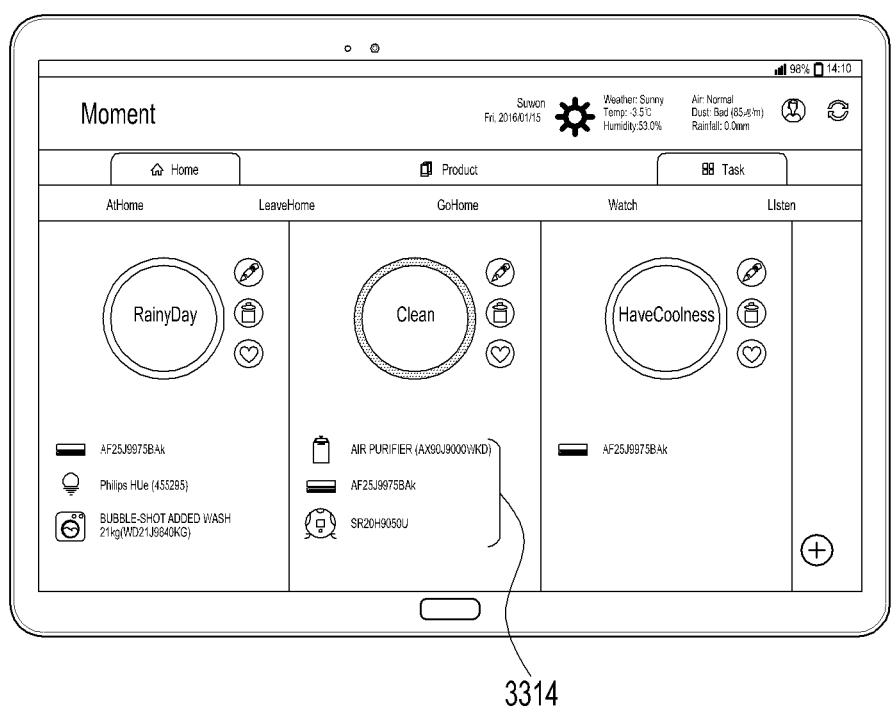

FIGS. 33A, 33B, and 33C illustrate conceptual diagrams of a task screen according to various embodiments of the present disclosure.

Referring to FIG. 33A, the electronic device may display one or more items 3302, 3304, and 3306 of a task in a task list 3301. Here, the items 3302, 3304, and 3306 may refer to recommended items that have not yet registered in the electronic device.

Furthermore, the electronic device may display information 3303, 3305, and 3307 of the device that is selected as a device to perform a task to correspond to one or more items 3302, 3304, and 3306, respectively. Furthermore, as shown in FIG. 33B, the electronic device may display a window 3311 to ask whether or not the registration is to be made, which includes information that is related to the device determined to perform a task, a registration refusal button 3312, and a registration approval button 3313. When the selection for the registration approval button 3313 is detected, the electronic device may register the device to perform a task, and when a task execution instruction is detected later, the electronic device may transmit a control instruction to the devices to perform a task. When the registration of the task is completed, as shown in FIG. 33C, the electronic device may display the registered items to be distinguished from other recommended items, and may display device information 3314 for performing the registered items.

Figure 34:
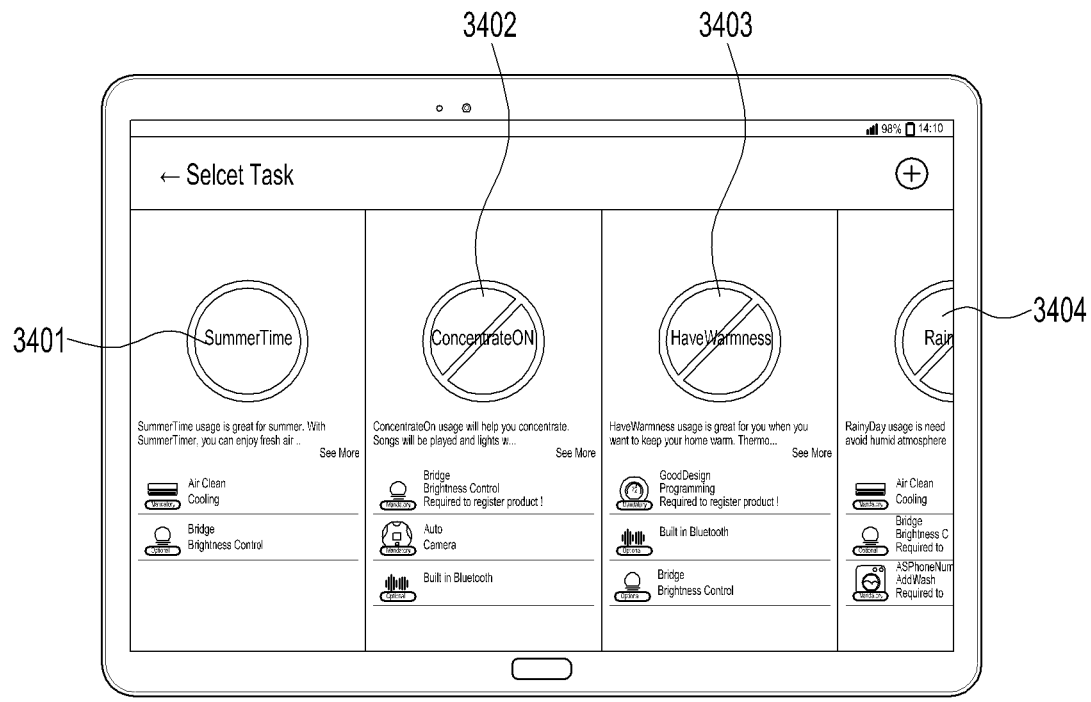
FIG. 34 illustrates a conceptual diagram of a task selection screen according to various embodiments of the present disclosure.

FIG. 34 illustrates a conceptual diagram of a task selection screen according to various embodiments of the present disclosure.

Referring to FIG. 34, the electronic device may separately display a selectable task 3401 and unselectable tasks 3402, 3403, and 3404. For example, the electronic device may compare device information and function information that are required by the recommend task with function information of the device that has been registered or discovered based on semantic information. According to the comparison result, the electronic device may display the selectable task 3401 while stating that the selection is possible, and may display the unselectable tasks 3402, 3403, and 3404 while stating that the selection is impossible. In addition, the electronic device may further display the statement that devices are required to be registered with respect to the unselectable tasks 3402 to 3404.

Figure 35:
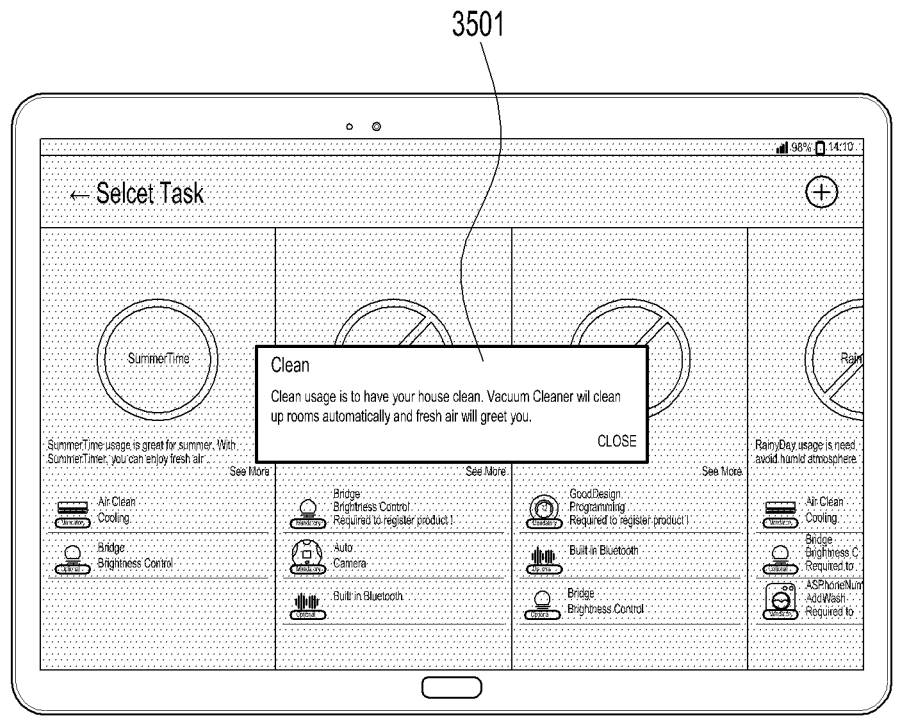
FIG. 35 illustrates a conceptual diagram of a screen when a selectable task is selected according to various embodiments of the present disclosure.

FIG. 35 illustrates a conceptual diagram of a screen when a selectable task is selected according to various embodiments of the present disclosure.

Referring to FIG. 35, if the user selects a task of "Clean", the electronic device may display information 3501 on the selected task.

Figure 36A:
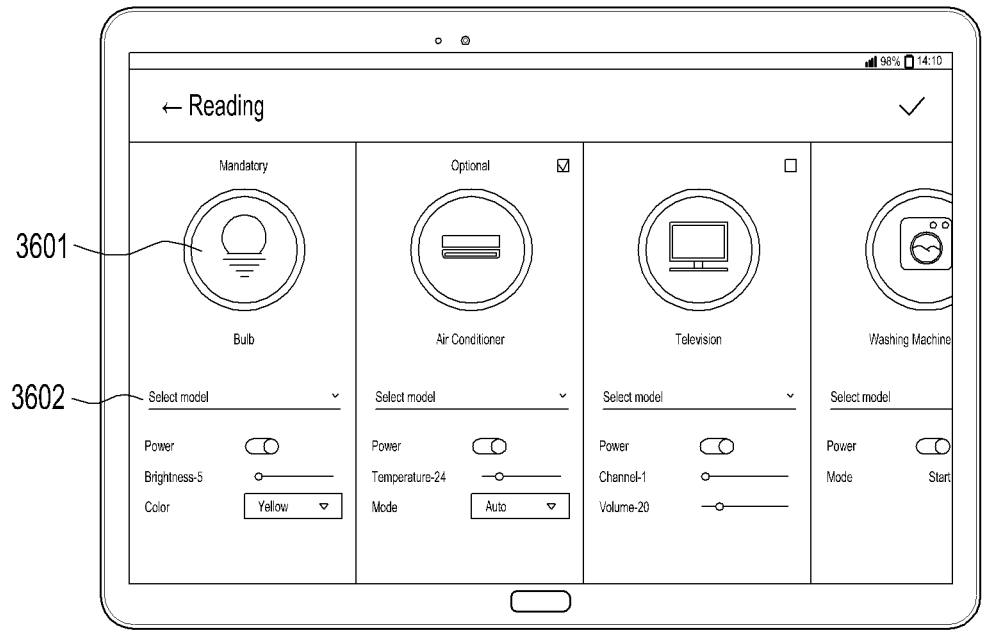
FIGS. 36A, 36B, and 36C illustrate conceptual diagrams of a screen for selecting a device to perform a task when creating a manual task according to various embodiments of the present disclosure.
Figure 36B:
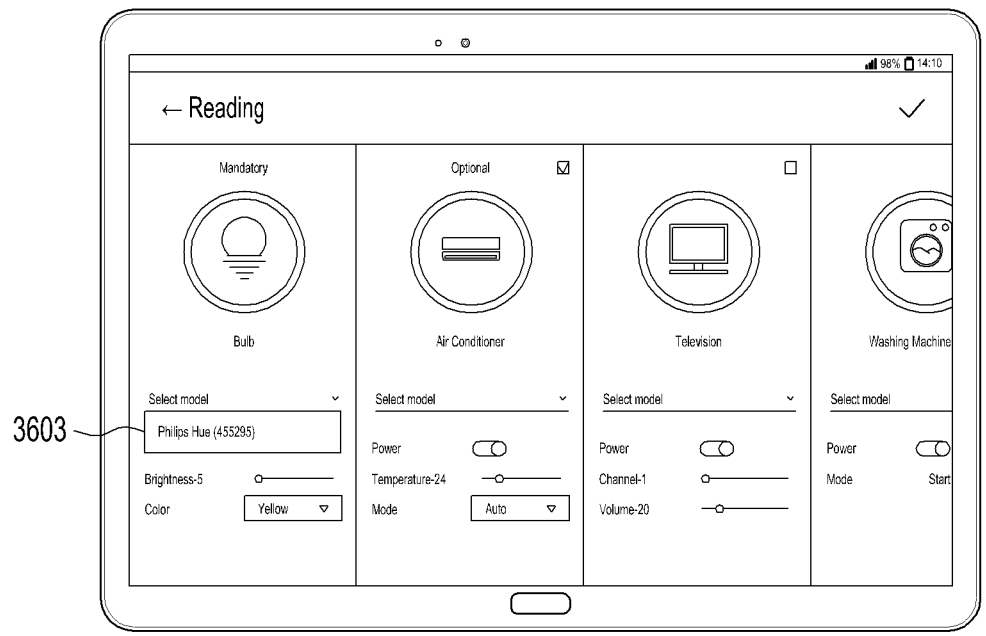
Figure 36C:
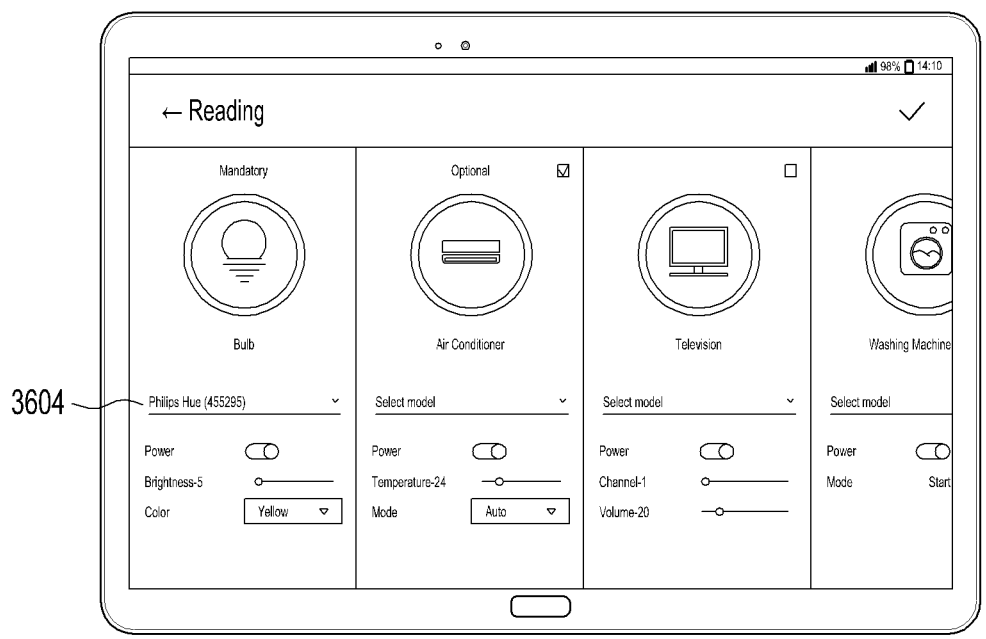

FIGS. 36A, 36B, and 36C illustrate conceptual diagrams of a screen for selecting a device to perform a task when creating a manual task according to various embodiments of the present disclosure.

Referring to FIG. 36A, the electronic device may create a task according to a user input. As illustrated, the electronic device may display information 3601 on a device to perform a specific task. In addition, the electronic device may display a button 3602 to provide a list of devices to perform a task in the device information 3601. In addition, the electronic device may display control information (for example, power, brightness, color, temperature, mode, channel, or volume) of each device together with an object to configure the same.

Referring to FIG. 36B, when a button 3602 for providing a list of devices to perform a task is selected, the electronic device may display a list 3603 of devices to perform a task. The electronic device may make a list 3603 of devices to perform a task based on the comparison result between the task ontology and the product information ontology based on semantic information.

Referring to FIG. 36C, when a specific device is selected, the electronic device may determine the selected device as a device to perform a task, and may display an identifier 3604 of the device.

Figure 37A:
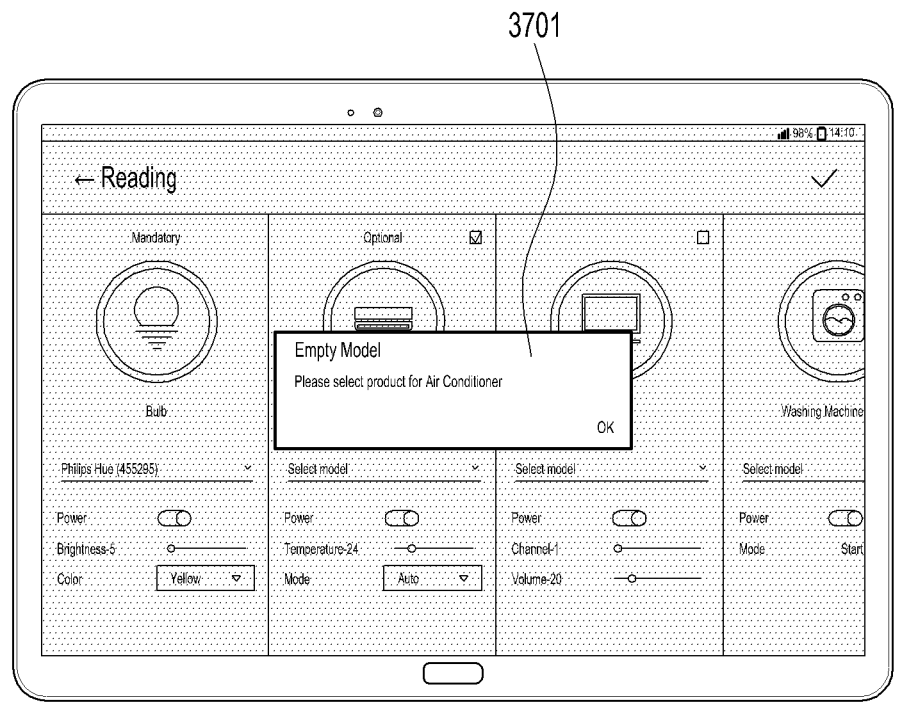
FIGS. 37A and 37B illustrate conceptual diagrams of a screen when creating a manual task according to various embodiments of the present disclosure.
Figure 37B:
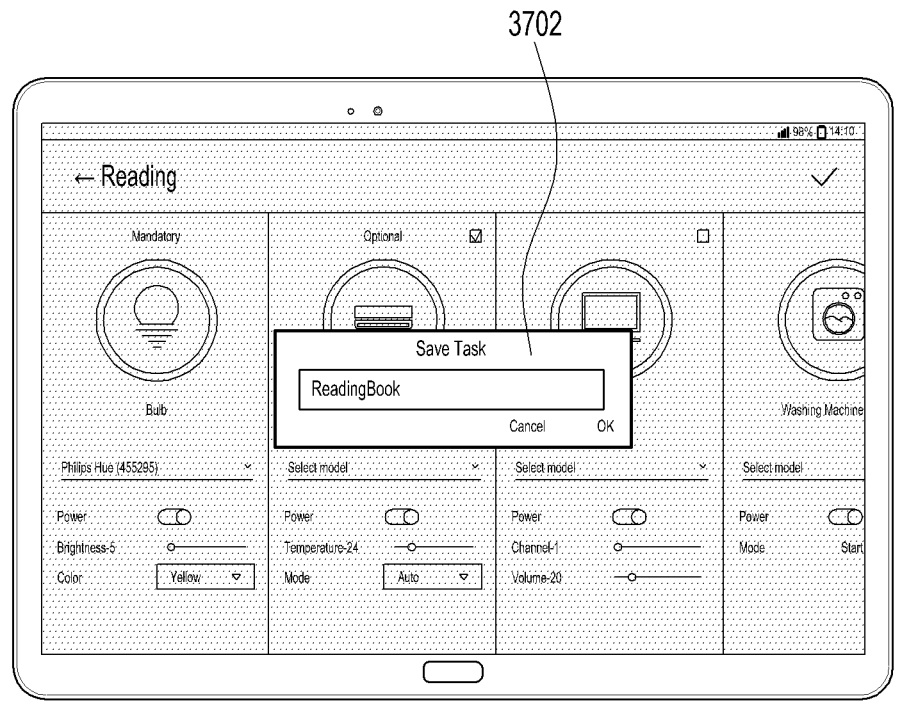

FIGS. 37A and 37B illustrate conceptual diagrams of a screen when creating a manual task according to various embodiments of the present disclosure.

Referring to FIG. 37A, if the electronic device fails to select a device to perform a specific task, the electronic device may display a window 3701 to request the registration of a device along with a statement that the electronic device has failed to search for a device to perform a task.

Referring to FIG. 37B, a window 3702 is illustrated through which a manual task name may be input when the writing of the manual task is completed.

Figure 38A:
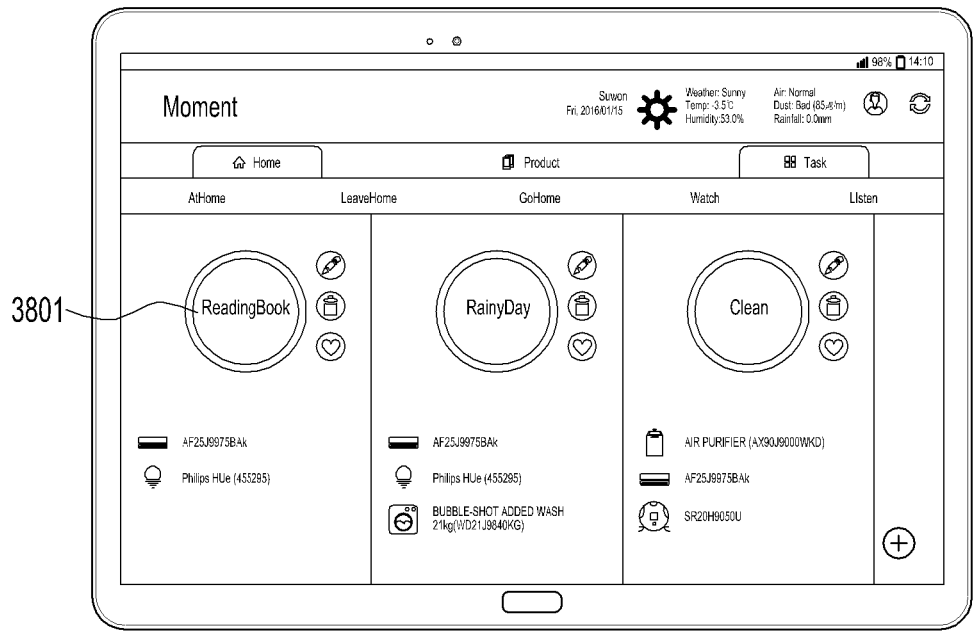
FIGS. 38A and 38B illustrate conceptual diagrams for explaining a screen change according to a selection for a task according to various embodiments of the present disclosure.
Figure 38B:
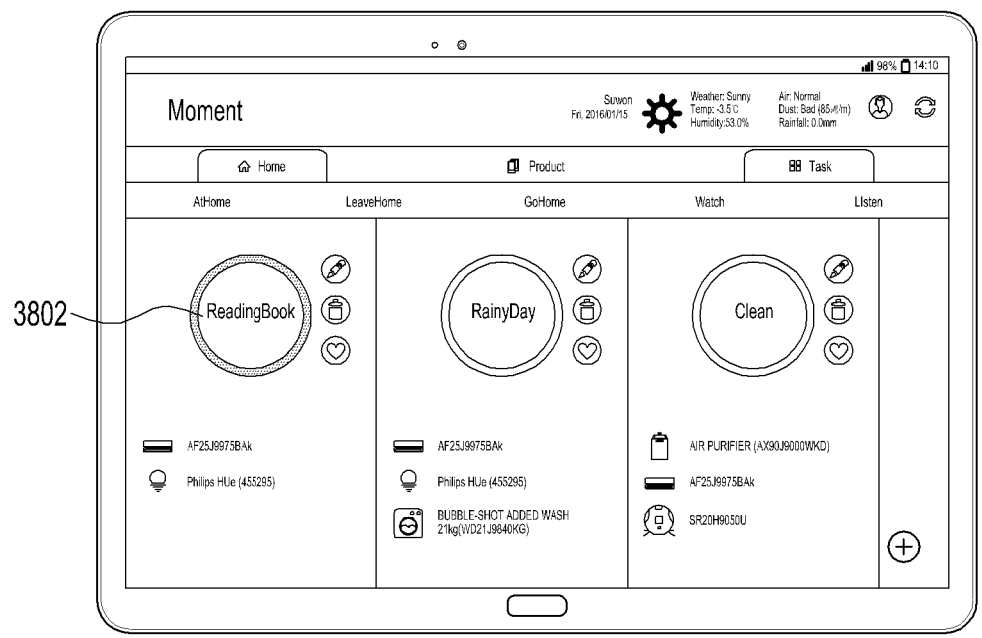

FIGS. 38A and 38B illustrate conceptual diagrams for explaining a screen change according to the selection of a task according to various embodiments of the present disclosure.

Referring to FIG. 38A, if no task is selected, the electronic device may deactivate and display an icon 3801.

Referring to FIG. 38B, if a task is selected, the electronic device may activate and display an icon 3802.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating an electronic device, the method comprising:
   identifying, by at least one processor of the electronic device, a position of the electronic device based on a network in which the electronic device is disposed;
   detecting, by the at least one processor, a trigger for executing a first task;
   based on detecting the trigger, identifying, by the at least one processor, functions for each type of device required to perform the first task;
   identifying, by the at least one processor, functions capable of being performed by a plurality of external electronic devices;
   comparing, by the at least one processor, the functions capable of being performed by the plurality of external electronic devices with the functions for each type of device required to perform the first task;
   identifying, by the at least one processor, one or more external electronic devices capable of performing the first task, among the plurality of external electronic devices, based on comparing the functions capable of being performed by the plurality of external electronic devices with the functions for each type of device required to perform the first task;
   based on the position of the electronic device being identified to be in a first area:
      identifying, by the at least one processor, a first external electronic device, included in the first area, to perform the first task from among the identified one or more external electronic devices, and
      transmitting, by a communication circuit of the electronic device, at least one task execution instruction for executing the first task to the first external electronic device; and
   based on the position of the electronic device being identified to be in a second area, different from the first area:
      identifying, by the at least one processor, a second external electronic device different from the first external electronic device, included in the second area, to perform the first task from among the identified one or more external electronic devices, and
      transmitting, by the communication circuit, the at least one task execution instruction for executing the first task to the second external electronic device.

2. The method according to claim 1, wherein the detecting of the trigger for executing the first task comprises:
   displaying pre-registered tasks; and
   detecting the trigger for executing the first task among the pre-registered tasks.

3. The method according to claim 2, further comprising:
   displaying recommended tasks; and
   registering, in the electronic device, a task that is identified from among the recommended tasks.

4. The method according to claim 2, further comprising:
   providing a user interface for inputting at least one of a name of a second task, information on a third external electronic device to perform the second task, functions corresponding to the third external electronic device to perform the second task, or control information for controlling the information on the third external electronic device to perform the second task; and
   creating and registering a new task based on the at least one of the name of the second task, the information on the third external electronic device to perform the second task, the functions corresponding to the third external electronic device to perform the second task, or the control information for controlling the information on the third external electronic device to perform the second task that is input in response to the user interface.

5. The method according to claim 2, further comprising:
   obtaining identification information of a device connected to the electronic device and control information of the connected device; and
   creating and registering a new task based on the identification information of the connected device, the control information of the connected device, and functions of the connected device.

6. The method according to claim 1, further comprising:
   discovering the one or more devices; or
   identifying the one or more devices as being pre-registered.

7. The method according to claim 1, further comprising:
   identifying the first external electronic device or the second external electronic device including a same function or a similar function as the functions for each piece of device information, by using a semantic information-based product information ontology.

8. The method according to claim 1, further comprising:
   identifying additional functions that are inferred from the functions for each type of device required to perform the first task, by using a semantic information-based task ontology; and
   identifying the first external electronic device or the second external electronic device including a same function or a similar function as at least one of the functions for each type of device required to perform the first task or the additional functions, by using a semantic information-based product information ontology.

9. The method according to claim 8, wherein the identifying of the additional functions comprises:
   inferring the additional functions based on a first function of first device information being related to the first task on the semantic information-based task ontology, or
   inferring the additional functions corresponding to the first device information based on a second function of third device information being related to the first task on the semantic information-based task ontology.

10. The method according to claim 1, further comprising:
   displaying a window for a user input to execute the first task based on information on an external environment, when the trigger is detected.

11. The method according to claim 1, further comprising:
obtaining general knowledge related to at least one piece of information among a semantic information-based task ontology and a semantic information-based product information ontology;
obtaining information related to compatibility; and
updating at least one of the semantic information-based task ontology or the semantic information-based product information ontology, based on the general knowledge, common sense, and the information that is related to compatibility.

12. An electronic device comprising:
a communication circuit; and
at least one processor configured to:
    identify a position of the electronic device based on a network in which the electronic device is disposed,
    detect a trigger for executing a first task,
    based on detecting the trigger, identify functions for each type of device required to perform the first task,
    identify functions capable of being performed by a plurality of external electronic devices,
    compare the functions capable of being performed by the plurality of external electronic devices with the functions for each type of device required to perform the first task,
    identify one or more external electronic devices capable of performing the first task, among the plurality of external electronic devices, based on comparing the functions capable of being performed by the plurality of external electronic devices with the functions for each type of device required to perform the first task,
    based on the position of the electronic device being identified to be in a first area:
        identify a first external electronic device, included in the first area, to perform the first task from among the identified one or more external electronic devices, and
        transmit, by using the communication circuit, at least one task execution instruction for executing the first task to the first external electronic device, and
    based on the position of the electronic device being identified to be in a second area, different from the first area:
        identify a second external electronic device different from the first external electronic device, included in the second area, to perform the first task from among the identified one or more external electronic devices, and
        transmit, by using the communication circuit, the at least one task execution instruction for executing the first task to the second external electronic device.

13. The electronic device according to claim 12, further comprising:
a display,
    wherein the at least one processor is further configured to:
        control the display to display pre-registered tasks, and
        detect the trigger for executing the first task from among the pre-registered tasks.

14. The electronic device according to claim 12, wherein the communication circuit is further configured to discover the plurality of external electronic devices.

15. The electronic device according to claim 12, wherein the at least one processor is further configured to identify the plurality of external electronic devices as being pre-registered.

16. The electronic device according to claim 12, wherein the at least one processor is further configured to:
    identify the first external electronic device or the second external electronic device including a same function or a similar function as the function for each type of device required to perform the first task, by using a semantic information-based product information ontology.

17. The electronic device according to claim 12, wherein the at least one processor is further configured to:
    identify additional functions that are inferred from the functions for each type of device required to perform the first task, by using a semantic information-based task ontology, and
    identify the first external electronic device or the second external electronic device including a same function or a similar function as at least one of the functions for each type of device required to perform the first task or the additional functions, by using a semantic information-based product information ontology.

18. The electronic device according to claim 17, wherein, when identifying the additional functions, the at least one processor is further configured to:
    infer the additional functions based on a first function of a first device information being related to the first task on the semantic information-based task ontology, or
    infer the additional functions corresponding to the first device information based on a second function of third device information being related to the first task on the semantic information-based task ontology.

19. The method of claim 1,
    wherein the first area is associated with a first network, and
    wherein the second area is associated with a second network, different from the first network.

* * * * *